US011837829B2

(12) United States Patent
Masel et al.

(10) Patent No.: US 11,837,829 B2
(45) Date of Patent: Dec. 5, 2023

(54) ADAPTER DEVICE FOR POWER BUSBAR SYSTEMS

(71) Applicant: Woehner GmbH & Co. KG Elektrotechnische Systeme, Roedental (DE)

(72) Inventors: Joram Masel, Kueps (DE); Hans-Juergen Henning, Ebersdorf (DE)

(73) Assignee: Woehner GmbH & Co. KG Elektrotechnische Systeme, Roedental (DE)

( * ) Notice: Subject to any disclaimer, the term of this patent is extended or adjusted under 35 U.S.C. 154(b) by 47 days.

(21) Appl. No.: 16/952,325

(22) Filed: Nov. 19, 2020

(65) Prior Publication Data

US 2021/0159650 A1    May 27, 2021

(30) Foreign Application Priority Data

Nov. 26, 2019    (EP) .................................... 19211525

(51) Int. Cl.
*H01R 33/94*    (2006.01)
*H01R 13/502*    (2006.01)
(Continued)

(52) U.S. Cl.
CPC ........... *H01R 33/94* (2013.01); *H01R 13/502* (2013.01); *H01R 33/88* (2013.01); *H01R 33/92* (2013.01);
(Continued)

(58) Field of Classification Search
CPC ...... H01R 33/94; H01R 13/502; H01R 33/88; H01R 33/92; H01R 33/945; H02B 1/052; H02B 1/205
See application file for complete search history.

(56) References Cited

U.S. PATENT DOCUMENTS 9,531,146 B2 * 12/2016 Steinberger .............. H02B 1/21

FOREIGN PATENT DOCUMENTS

| CN | 102436940 A | 5/2012 |
| CN | 103444000 A | 12/2013 |

(Continued)

OTHER PUBLICATIONS

European Search Report corresponding to European application No. EP 19211525, dated May 18, 2020 (2 pages).

*Primary Examiner* — Oscar C Jimenez
*Assistant Examiner* — Paul D Baillargeon
(74) *Attorney, Agent, or Firm* — Maginot, Moore & Beck LLP

(57) ABSTRACT

Adapter device (1) for connecting at least one electrical device (2) adapted for a busbar subsystem (11, 12) to a busbar main system (7), wherein the adapter housing (4) of the adapter device (1) comprises a busbar main interface (22) on a rear side of the housing for electromechanical contacting of busbars (6) of the busbar main system (7) and one or more busbar sub-interfaces on a front side of the housing, which are provided for placing the at least one electrical device (2) on the adapter device (1) and for its electrical connection to the busbar main system (7) via busbars (15, 16) of the respective busbar sub-system (11, 12) integrated in the adapter housing (4) or attached thereto and via electrical conductors (28) contained in the adapter housing (4).

18 Claims, 42 Drawing Sheets

(51) Int. Cl.
*H01R 33/88* (2006.01)
*H01R 33/92* (2006.01)
*H01R 33/945* (2006.01)
*H02B 1/052* (2006.01)
*H02B 1/20* (2006.01)

(52) U.S. Cl.
CPC ........... *H01R 33/945* (2013.01); *H02B 1/052* (2013.01); *H02B 1/205* (2013.01)

(56) References Cited

FOREIGN PATENT DOCUMENTS

| | | | |
|---|---|---|---|
| CN | 104682071 A | 6/2015 | |
| CN | 104868368 A | 8/2015 | |
| CN | 108136106 A | 6/2018 | |
| DE | 10 2005 009 856 A1 | 9/2006 | |
| EP | 0 593 399 A1 | 4/1994 | |
| EP | 0 753 916 A2 | 1/1997 | |
| EP | 0 753 916 A3 | 1/1997 | |
| EP | 1 045 497 A2 | 10/2000 | |
| EP | 1 045 497 A3 | 10/2000 | |
| ES | 2013414 A6 | 5/1995 | |
| ES | 2306573 A1 | 11/2008 | |
| TW | M258403 U | 3/2005 | |
| WO | 2014143020 A1 | 9/2014 | |

\* cited by examiner

ADAPTER DEVICE FOR POWER BUSBAR SYSTEMS

This application claims priority to European Application No. EP 19211525.1, filed on Nov. 26, 2019. The entire contents of the above-mentioned patent applications are incorporated herein by reference as part of the disclosure of this U.S. application.

The present invention relates to an adapter device for various types of busbar systems, which allows electrical devices adapted for a specific busbar sub-system to be connected to a differing main busbar system.

Busbars comprise an assembly of current conductors that may serve to supply electrical energy. Busbars may be made of aluminum or copper, for example. One or more electrical devices, in particular switchgear, may be mounted on busbars. In many cases, the busbars are installed in lockable switch cabinets, since conventional busbars themselves do not provide contact-protection against accidental contact. Busbars may transmit both AC and DC voltages. Several busbars may be mounted parallel to each other and carry different current phases, for example L1, L2, L3, of a power supply system. Furthermore, busbars may also form neutral conductor N or protective ground conductor PE. The spatial dimensions may be different for different busbar systems. Busbars with a large cross section are suitable for carrying currents with high nominal currents. Also, the distance between different busbars arranged in parallel may be different for different busbar systems. Furthermore, hybrid busbars having contact slots may also be provided.

The electrical connection or combination of different busbar systems usually requires considerable effort in terms of installation and wiring. Furthermore, the connection points between conventional busbar systems are in many cases not contact-protective. A further disadvantage of conventional wiring of different busbar systems is that the connection may not be performed safely during operation or when a voltage is applied.

It is therefore an object of the present invention to provide an adapter device which allows connecting different busbar systems safely and flexibly.

According to the present invention, this object is achieved by an adapter device with the features defined in claim 1.

Accordingly, the present invention provides an adapter device for connecting at least one electrical device, which is adapted for a busbar sub-system, to a busbar main system, wherein the adapter housing of the adapter device comprises, on a rear side of the housing, a busbar main interface for electromechanically contacting of busbars of the busbar main system (and, on a front side of the housing, one or more busbar sub-interfaces, which are provided for placing the at least one electrical device on the adapter device, and which are provided for an electrical connection thereof to the busbar main system via busbars of the respective busbar sub-system integrated in the adapter housing or attached thereto and via electrical conductors contained in the adapter housing.

The adapter device is advantageous in that no manual wiring between the different busbar systems is required, thus reducing the installation effort.

In addition, the adapter device according to the present invention provides a safe and reliable electrical connection between different busbar systems.

A further advantage of the adapter device according to the present invention is that the connection between different busbar systems may also be made during operation or when a voltage is applied.

In a possible embodiment of the adapter device according to the present invention, the adapter housing of the adapter device comprises two separable adapter housing halves which are mechanically and electrically connected to each other.

In a possible embodiment of the adapter device according to the present invention, the two halves of the adapter housing comprise a first half of the adapter housing on the rear side of the adapter housing, which comprises the main busbar interface for electromechanical contacting of busbars of the main busbar system, and a second half of the adapter housing at the front of the adapter housing, which comprises the busbar sub-interfaces with the busbars of the different busbar sub-systems integrated in the adapter housing or mounted on the adapter housing.

In a further possible embodiment of the adapter device according to the present invention, the main busbar interface provided on the rear side of the adapter housing comprises an associated contact component for each busbar of the main busbar system for contacting the corresponding busbar of the main busbar system.

In a possible embodiment of the adapter device according to the present invention, several busbars of different busbar sub-systems provided on the front side of the adapter housing are electrically connected in parallel to the contact component via electrical conductors contained in the adapter housing of the adapter device. These electrical conductors may include electrical lines or rails.

In a further possible embodiment of the adaptor device according to the present invention, the busbars of the busbar sub-systems integrated in the adaptor housing each comprise slotted busbars, hybrid busbars or solid busbars.

In a possible embodiment of the adapter device according to the present invention, the hybrid busbars of the at least one busbar sub-interface each comprise a current-carrying rail profile and a contact-accommodating rail profile which comprises uniformly spaced contact slots for accommodating electrical contacts of an electrical device.

In a further possible embodiment of the adapter device according to the present invention, a wall on the front side of the housing of the adapter housing in the area of the busbar sub-interface comprises feed-through-slots for passing through electrical contacts of an electrical device to be connected, which are insertable into underlying contact slots of a slot-busbar or hybrid busbar integrated in the adapter housing or electrically contacting the busbars of the busbar main system.

In a further possible embodiment of the adapter device according to the present invention, the adapter housing of the adapter device is configured to be elongated, and comprises, on the rear side of the housing along a longitudinal axis of the adapter housing, a plurality of contact components arranged one above the other for contacting a plurality of busbars of the busbar main system which extend in parallel in the horizontal direction.

In a further possible embodiment of the adapter device according to the present invention, the first housing half of the adapter housing having the busbar main interface for electromechanical contacting of the busbars of the busbar main system is fixedly mounted on the busbars of the busbar main system.

In a further possible embodiment of the adapter device according to the present invention, the second half of the adapter housing provided on the front side of the housing, which has the busbar sub-interfaces, may be mechanically detached from the first half of the adapter housing, which is fixedly mounted on the busbars of the main busbar system, and after rotation by 180° along a transverse or rotational axis of the adapter housing may be mechanically re-connected to the first half of the adapter housing.

The rotation may also be used to connect lines that are fed to the adapter device from above in a switch cabinet.

In a further possible embodiment of the adapter device according to the present invention, the main busbar system comprises a number of at least two busbars for different current phases, which extend parallel to one another in the horizontal direction and which may each be electromechanically contacted by at least one contact component of the busbar main system provided on the rear side of the adapter housing to establish an electrical connection with a corresponding number of busbars of different busbar sub-systems integrated in the adapter housing on the front side of the housing or attached thereto.

In a further possible embodiment of the adapter device according to the present invention, the electrical devices mounted on the busbar sub-interfaces comprise outlet lines which may be guided through feed-through tunnels of busbar sub-interfaces in the direction of the longitudinal axis of the adapter housing to an end face of the adapter housing.

In a further possible embodiment of the adapter device according to the present invention, mounting rails for attaching terminal blocks or other accessories are provided on at least one end face of the adapter housing.

In a further possible embodiment of the adaptor device according to the present invention, the electrical devices mounted on the busbar sub-interfaces of the adaptor device comprise fuse-switch-disconnectors which are connected between the busbars of the main busbar system and electrical power loads which are clamped to terminals of terminal blocks and which, when manually operated, disconnect the electrical power loads from the busbars of the main busbar system or connect them to them.

By using the terminal blocks, a state of connection may be achieved which is easy to operate. The lines only have to be connected to the terminal blocks and do not have to be supplied to the devices in a complicated way through the adapter or the adapter housing. By rotating the front part of the adapter or the front half of the adapter housing by 180°, lines may be connected which are fed into a switch cabinet from above. The connection terminal blocks may be integrated in the adapter device or mounted on the adapter device as an accessory part.

In a further possible embodiment of the adapter device according to the present invention, the busbars of the busbar main system have a nominal current intensity different from the nominal current intensity of the busbars of the busbar sub-systems.

In a further possible embodiment of the adapter device according to the present invention, current and/or voltage measuring units for each busbar of the main busbar system are integrated in the adapter housing of the adapter device.

In addition, current measurement is possible on an inlet side of the sub-systems. A further current measurement is also possible on the outlet side of the sub-systems.

In the following, possible embodiments of the adapter device according to the present invention are explained in more detail with reference to the attached Figures.

Figure 14:
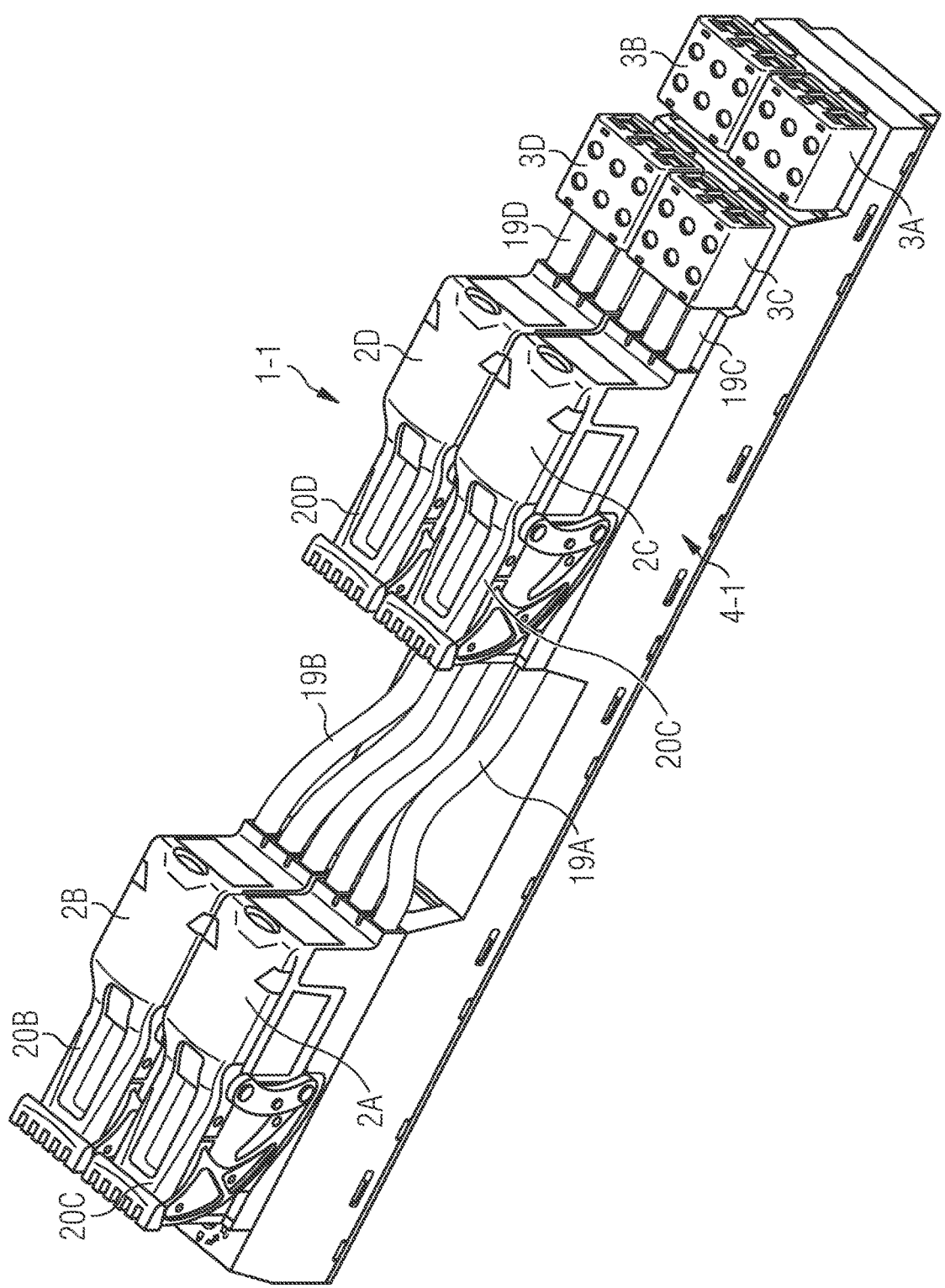
Figure 15:
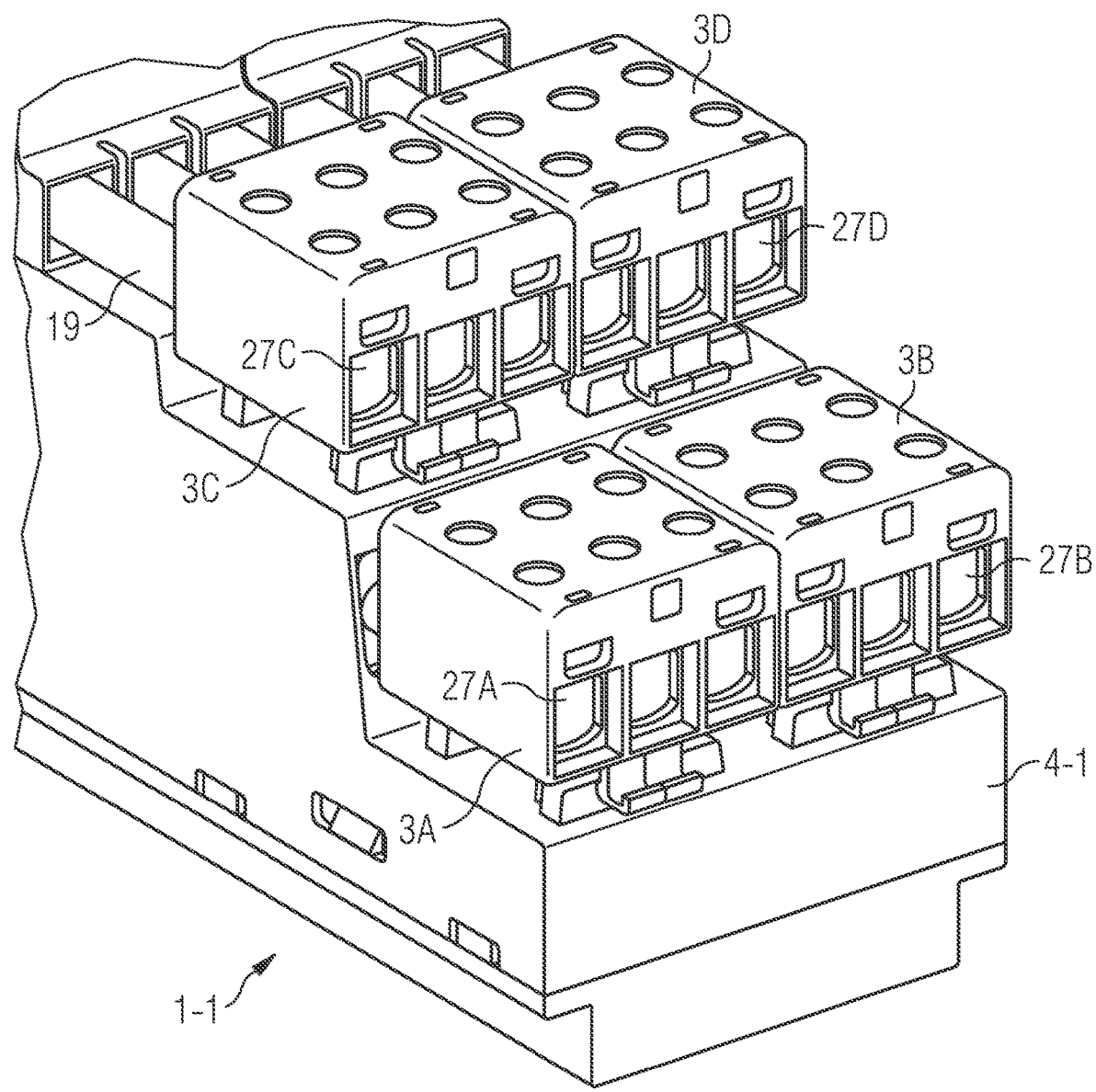
Figure 16:
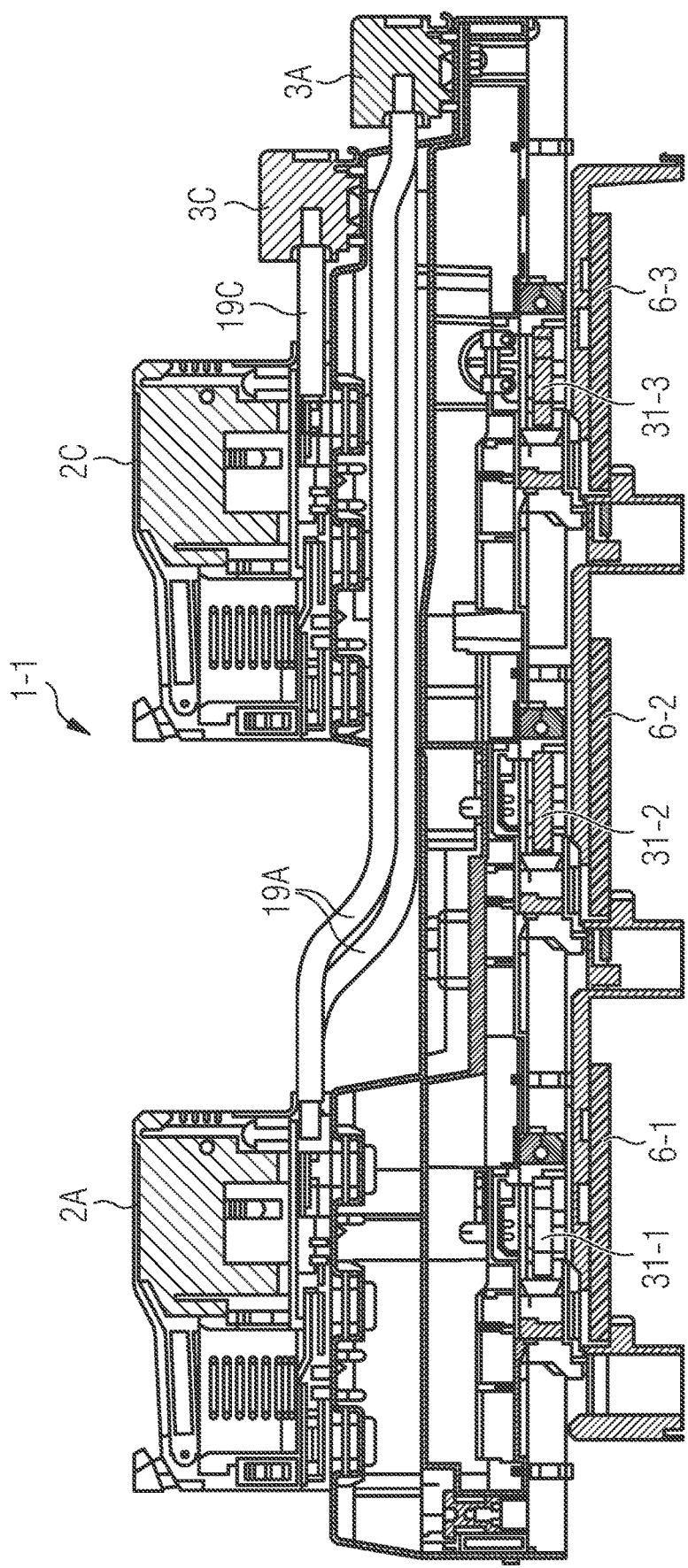
Figure 17:
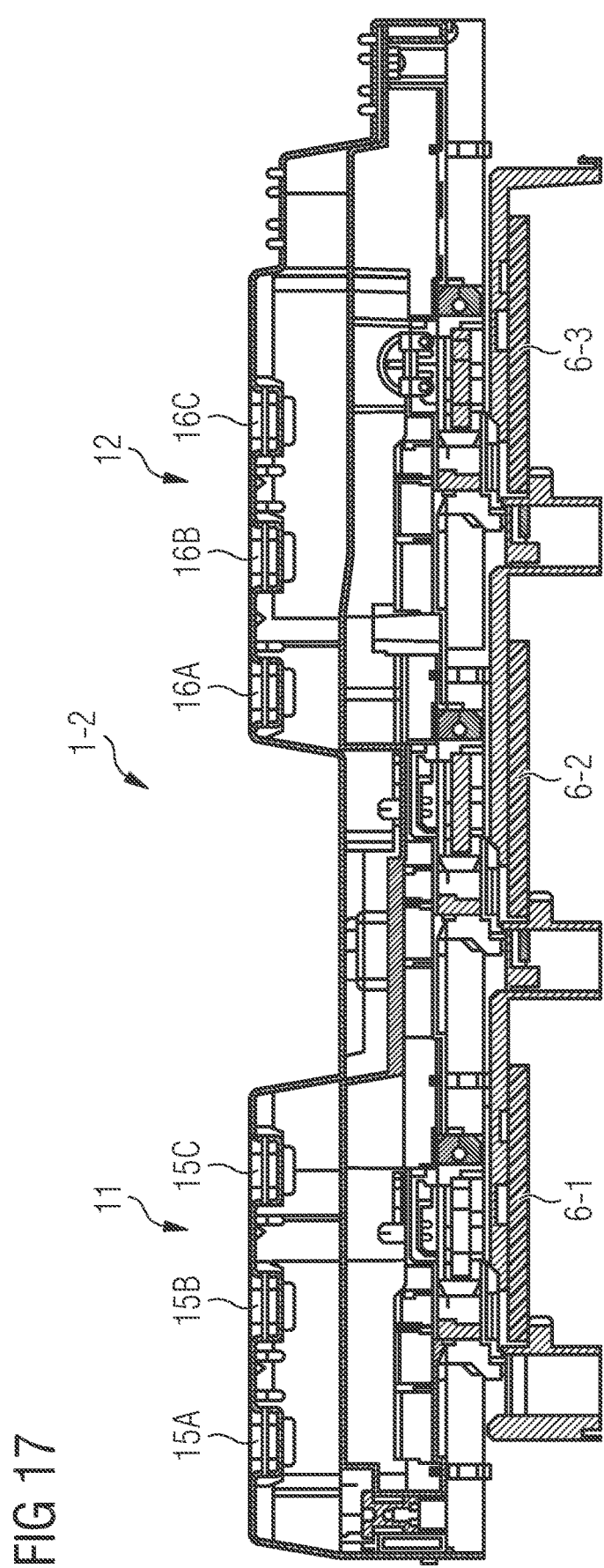
Figure 18:
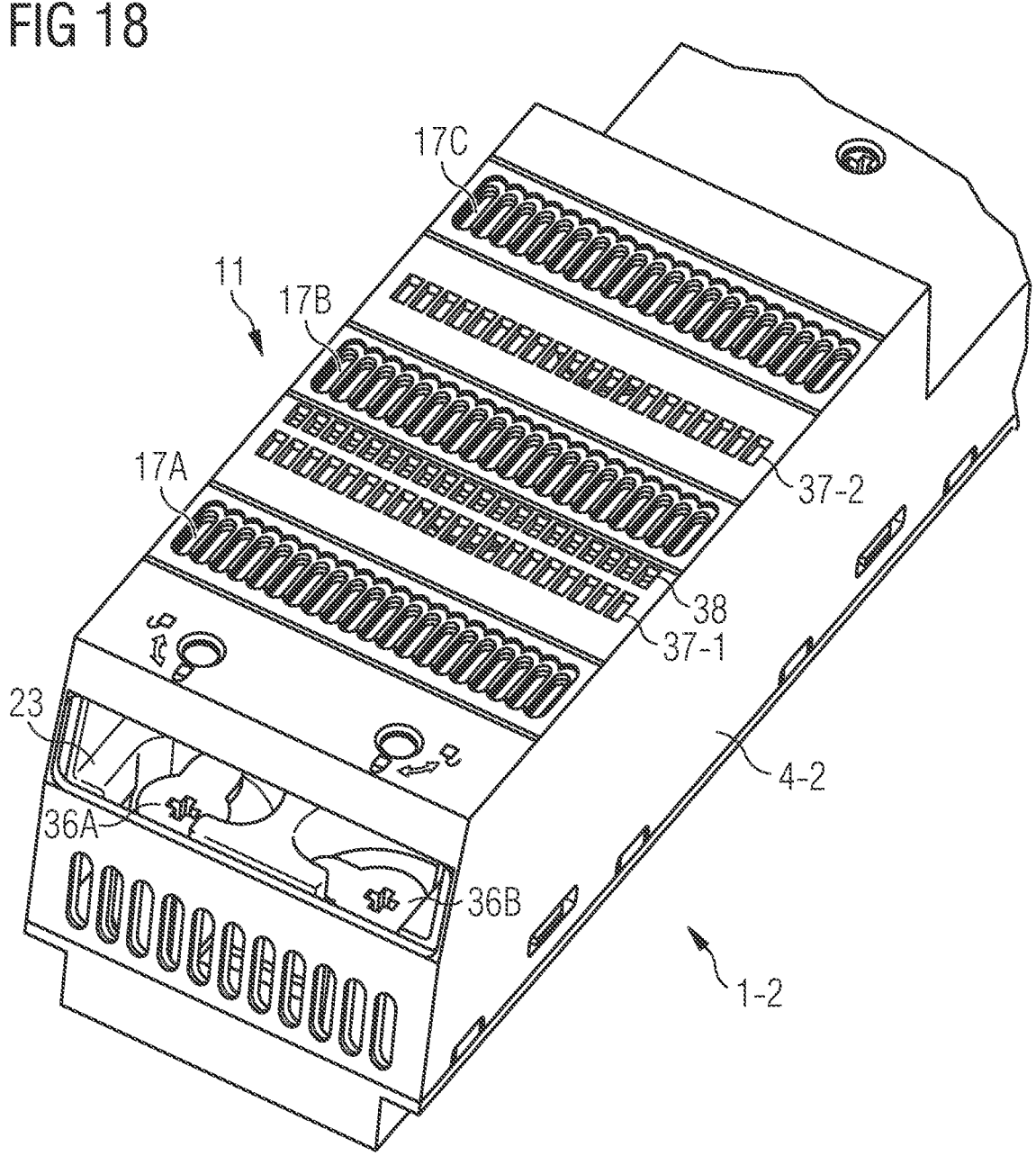
Figure 19:
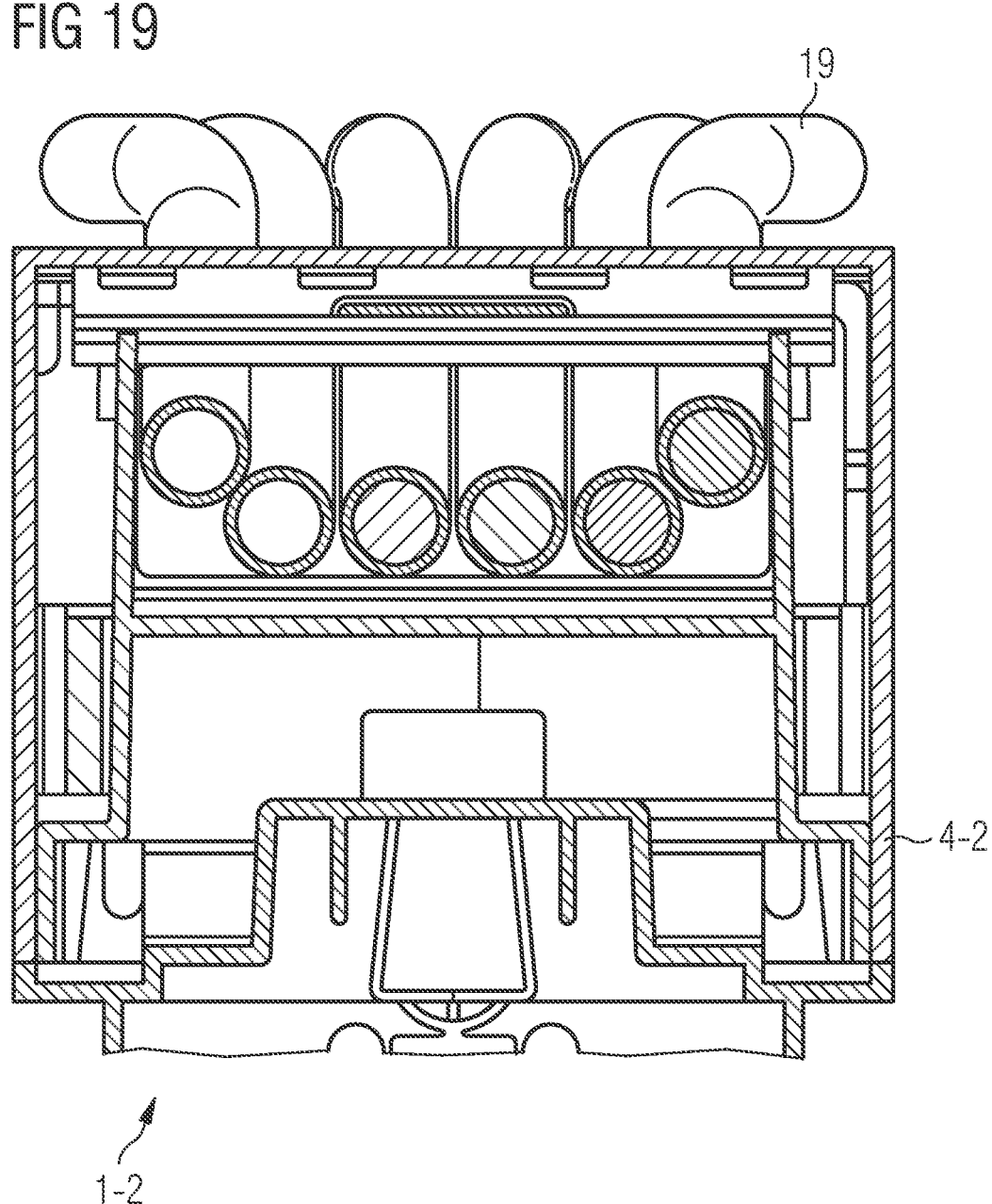
Figure 20:
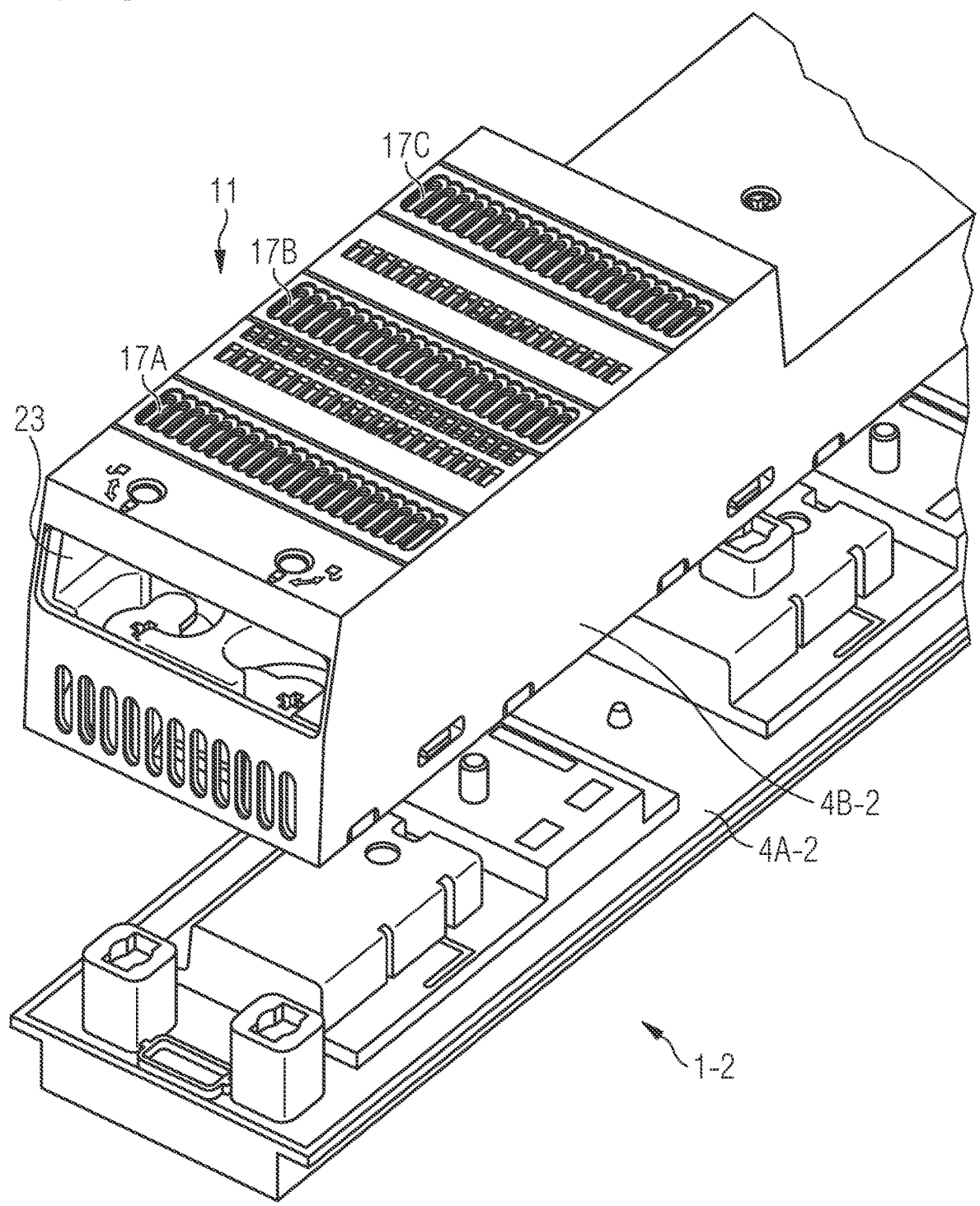
Figure 21:
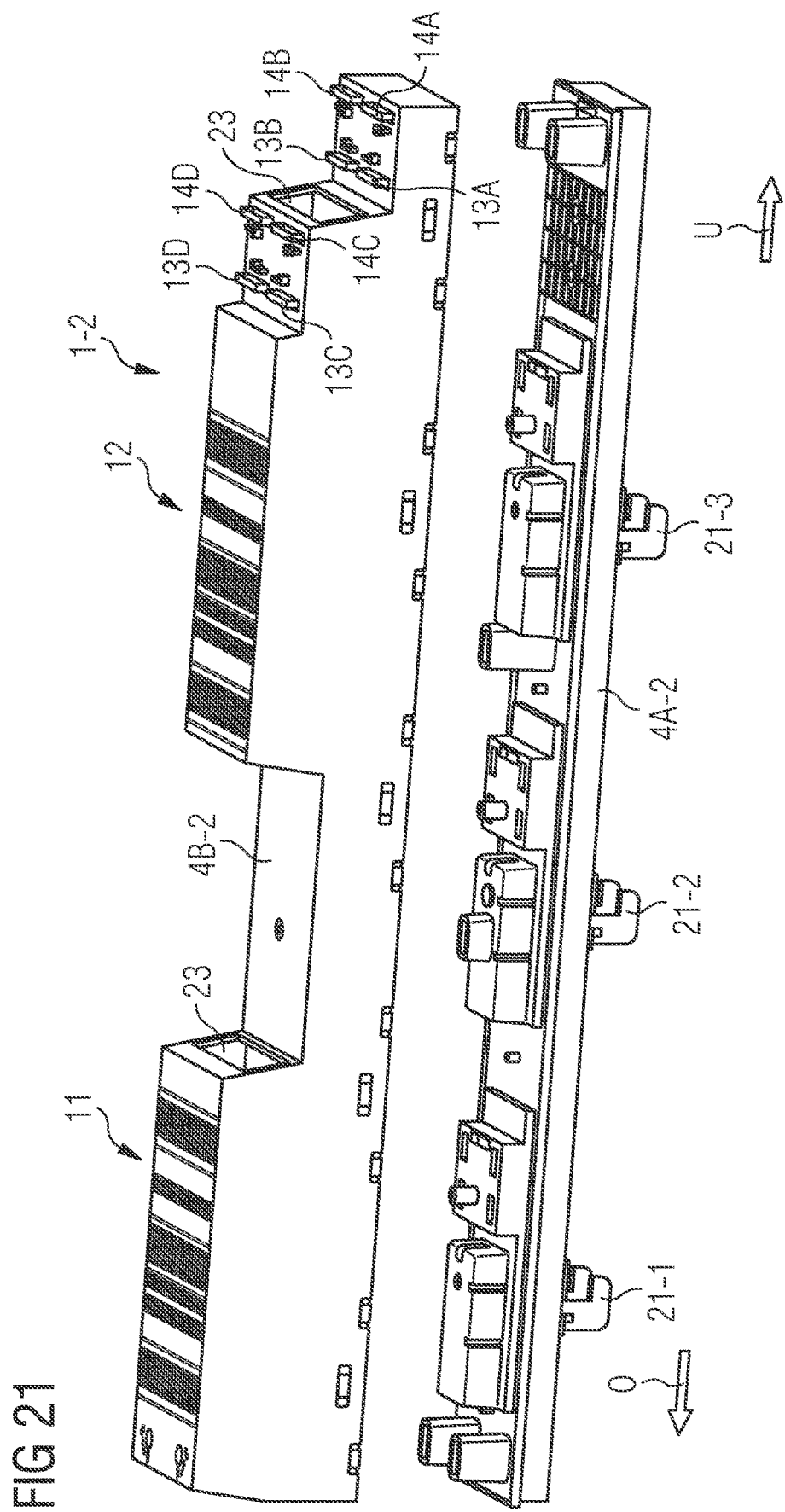
Figure 22:
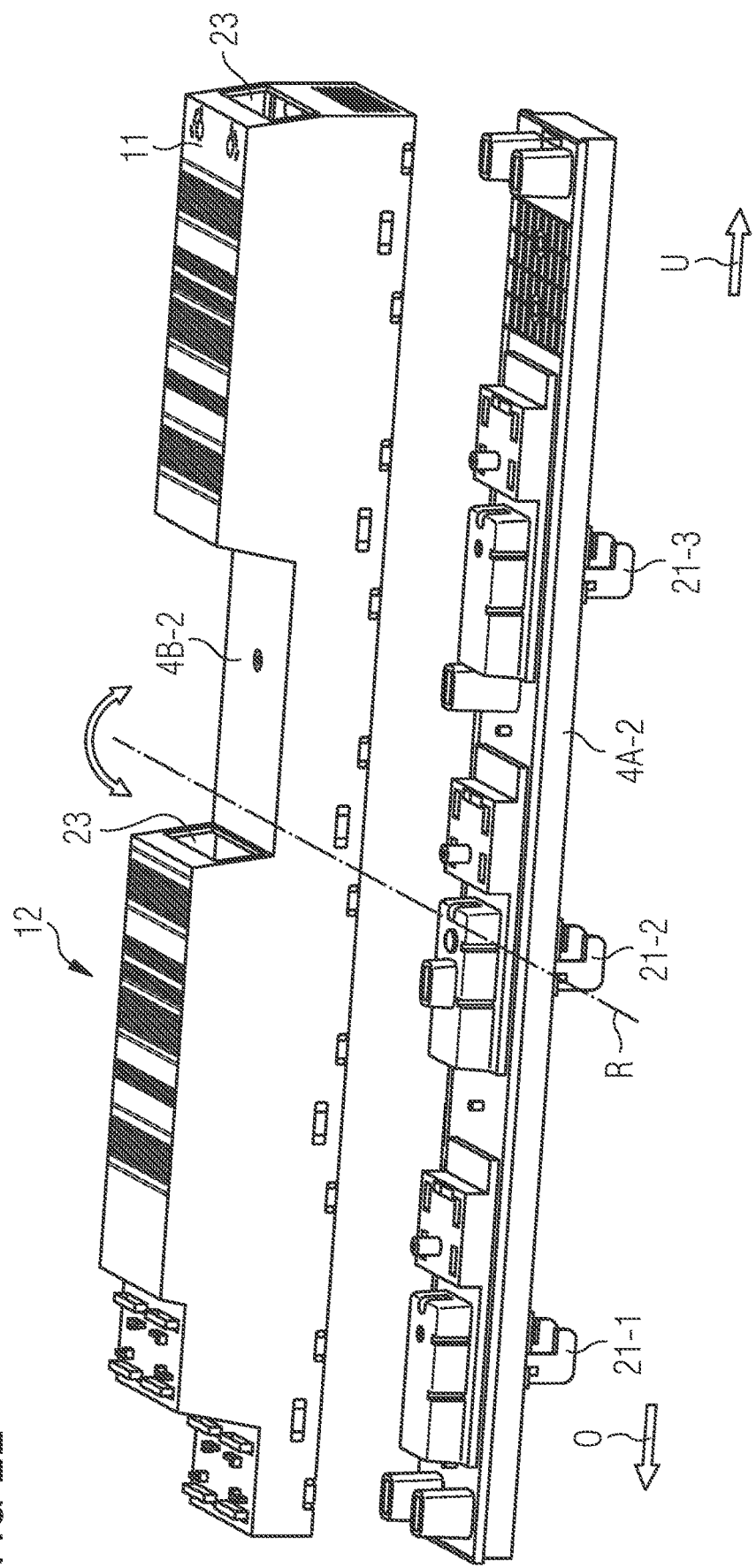
Figure 23:
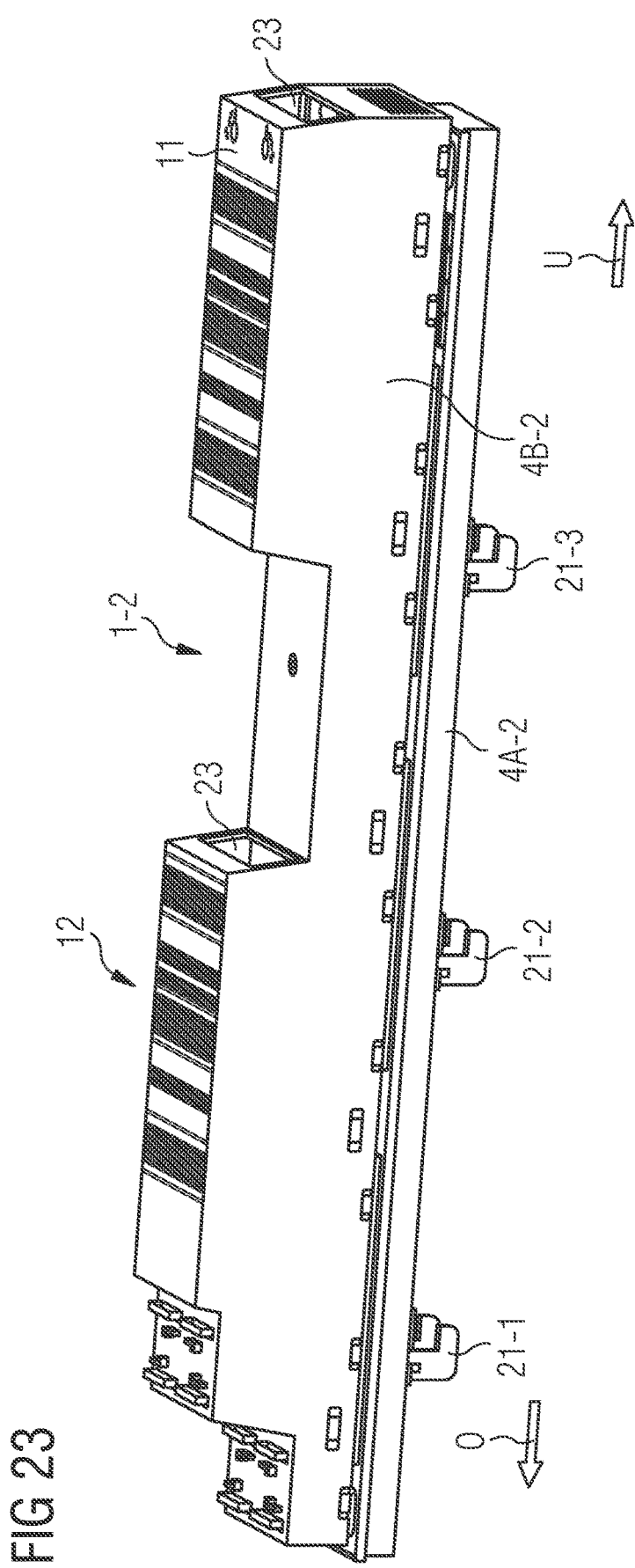
Figure 24:
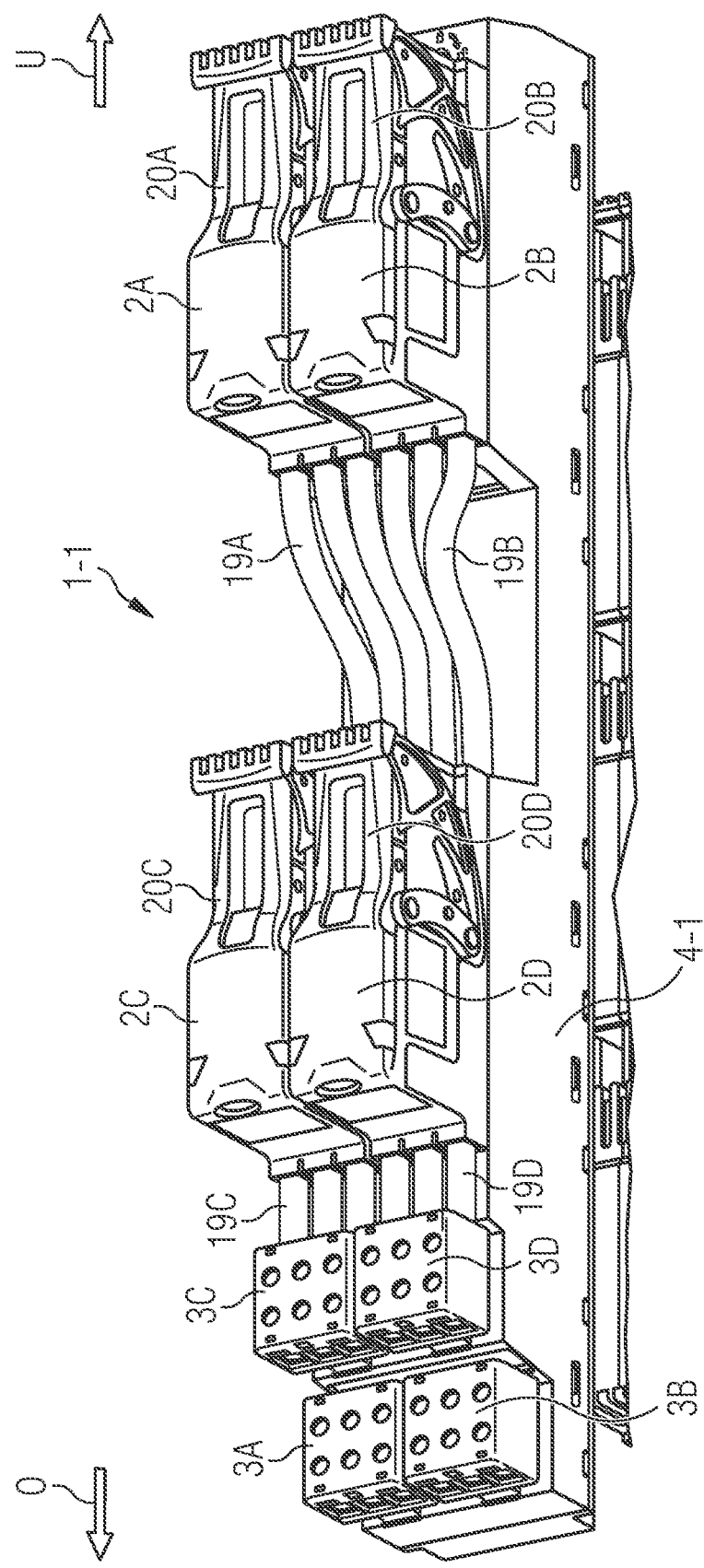
Figure 25:
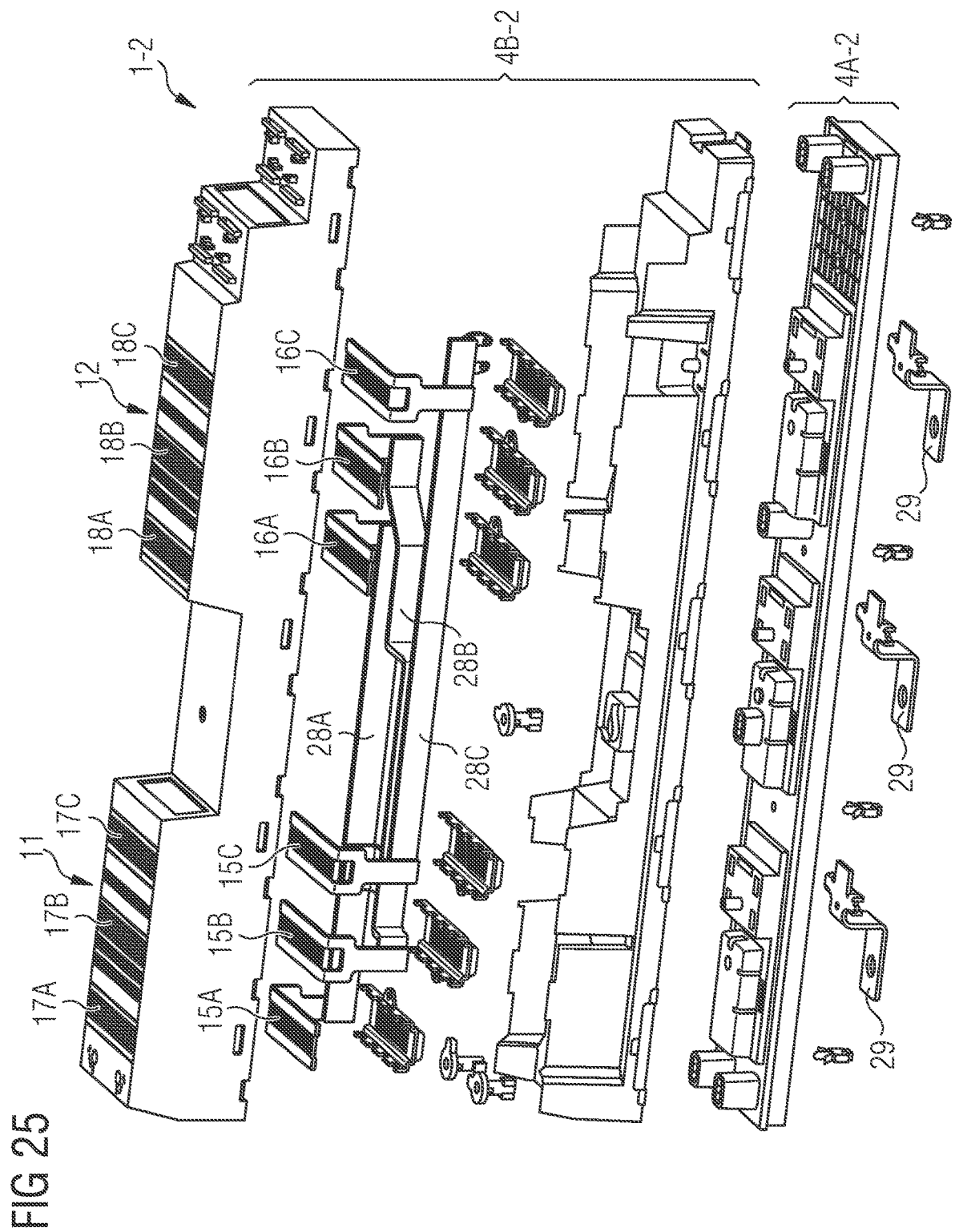
Figure 26:
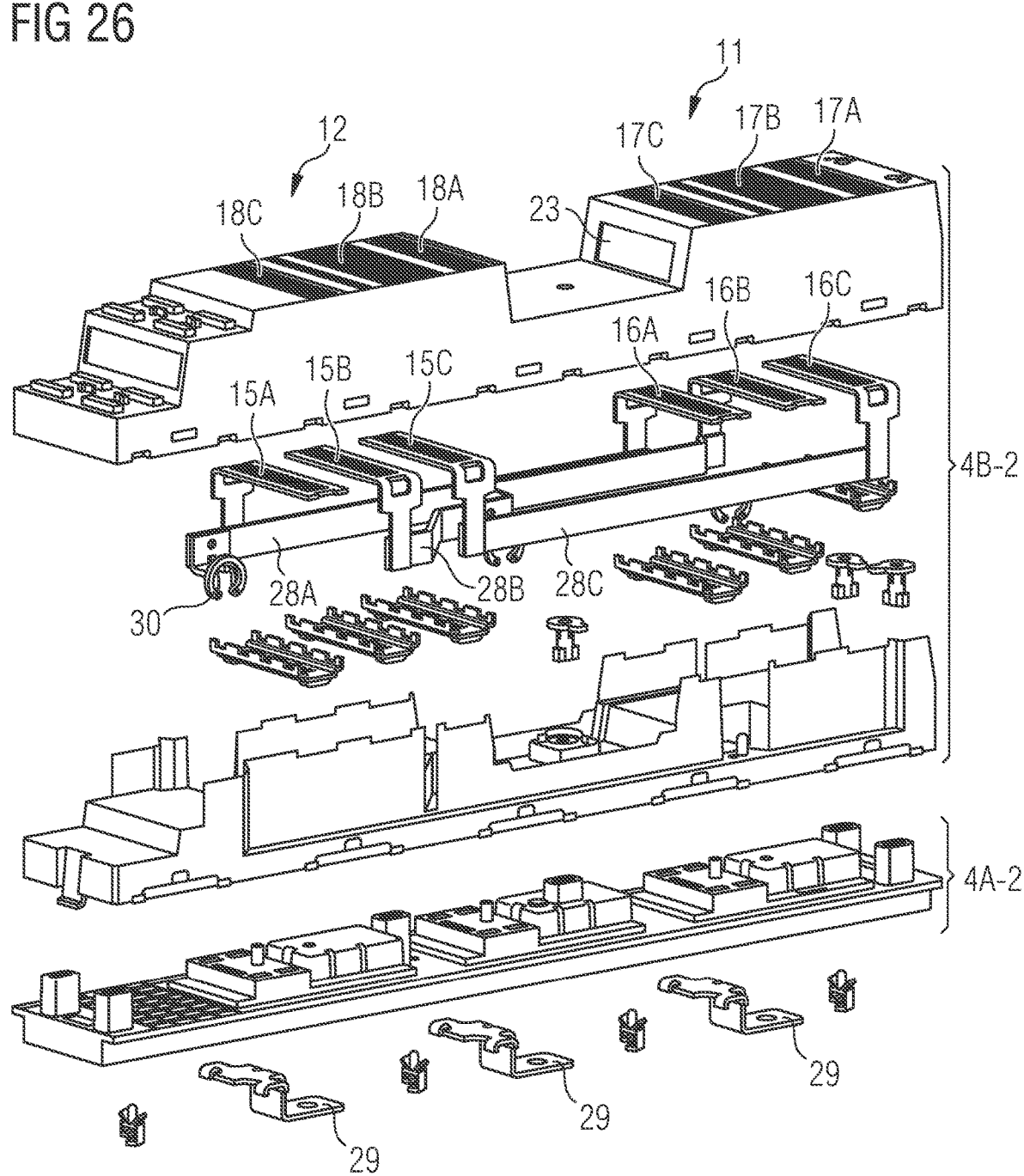
Figure 27:
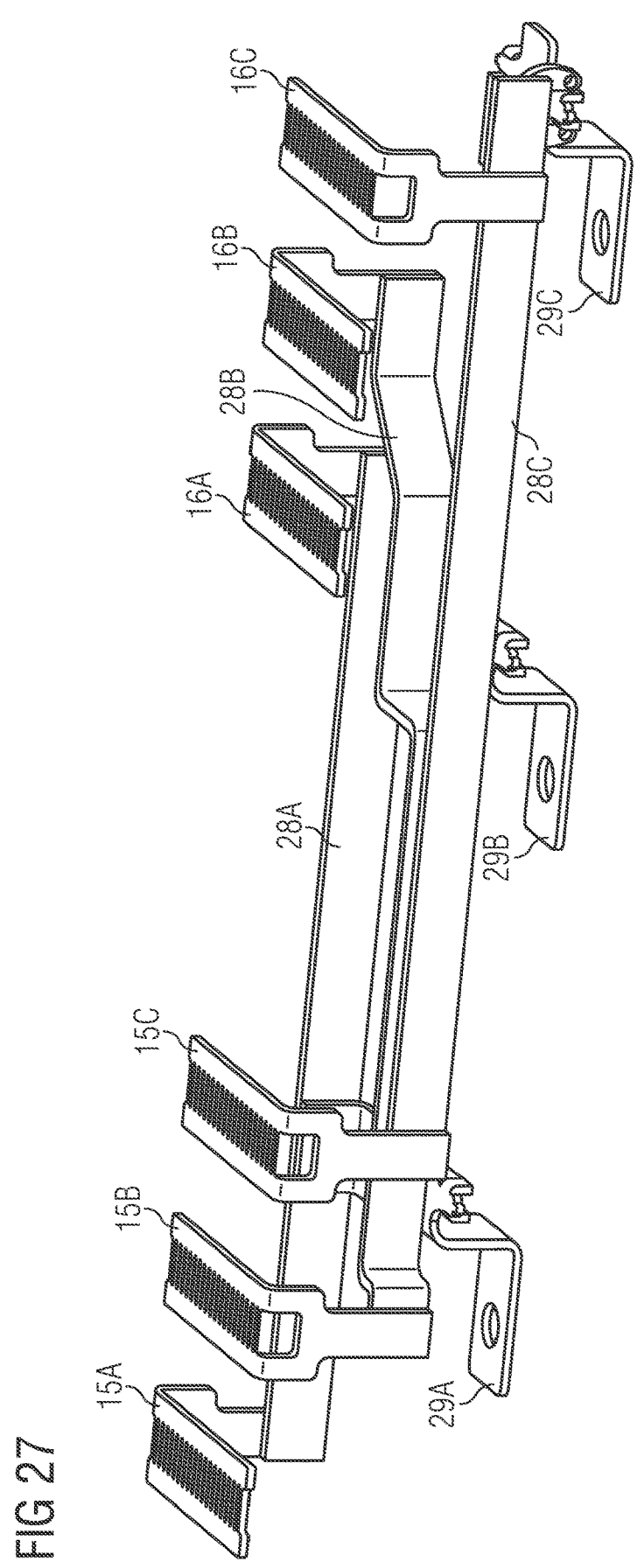
Figure 28:
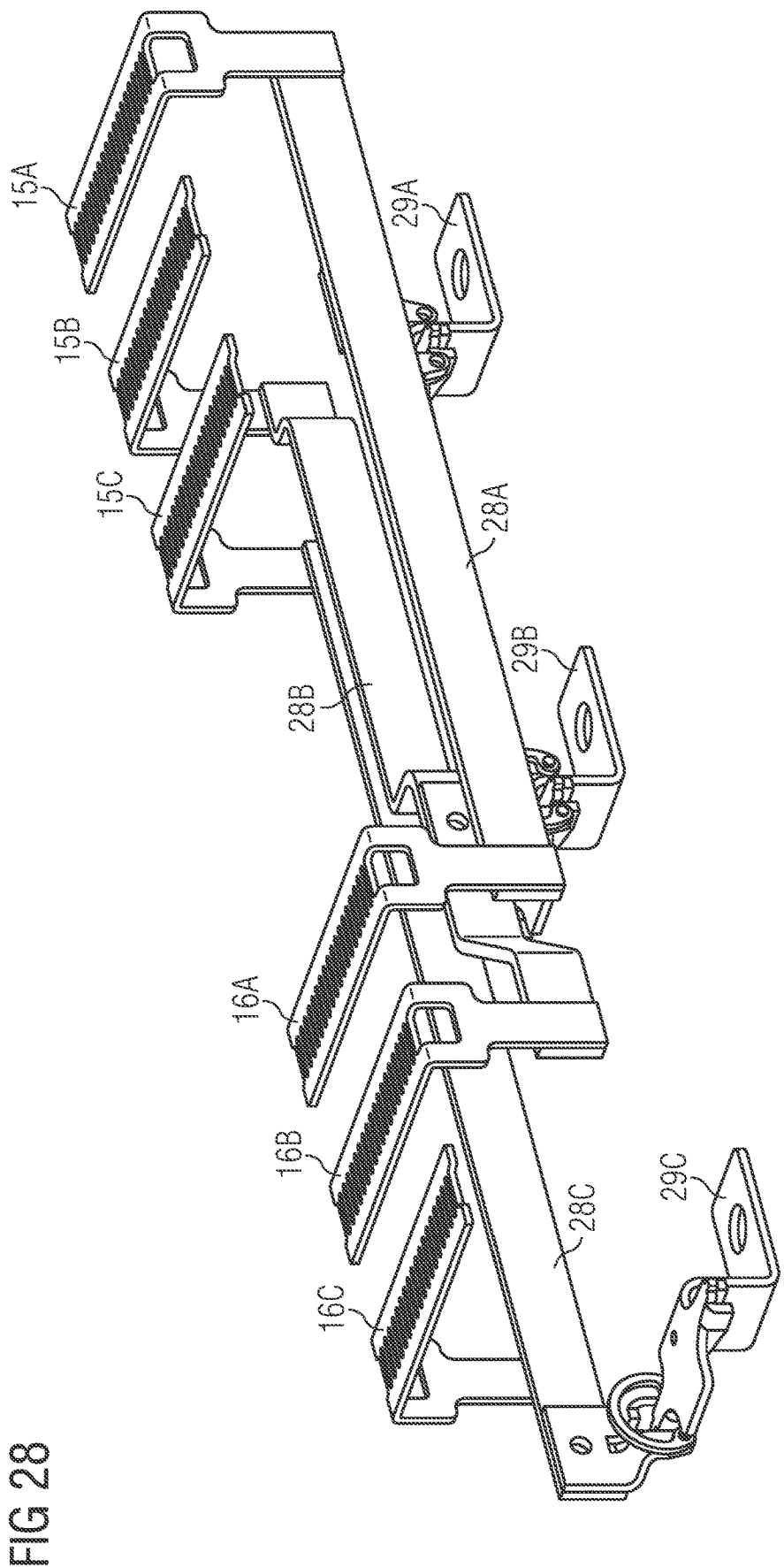
Figure 29:
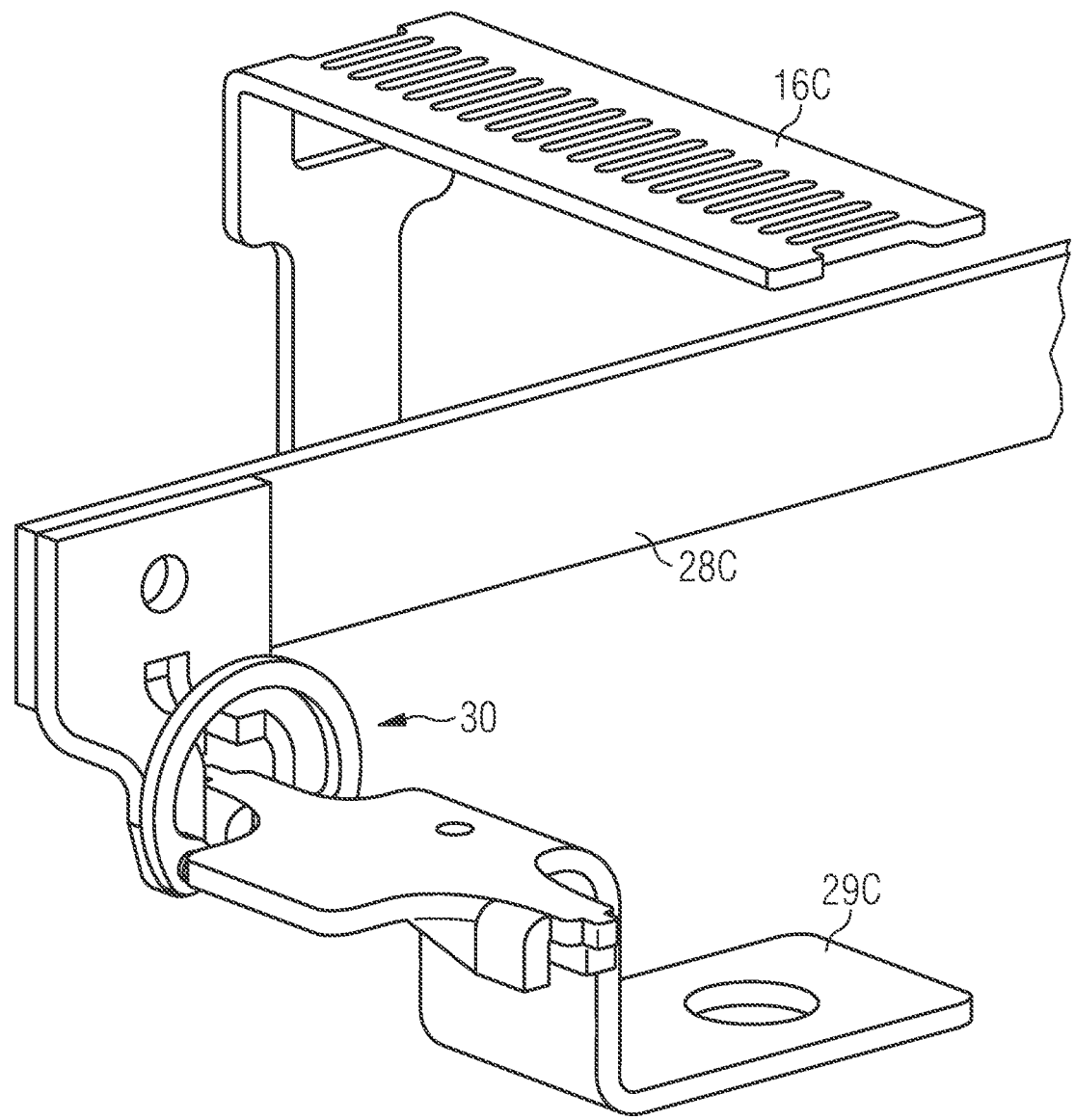
Figure 30:
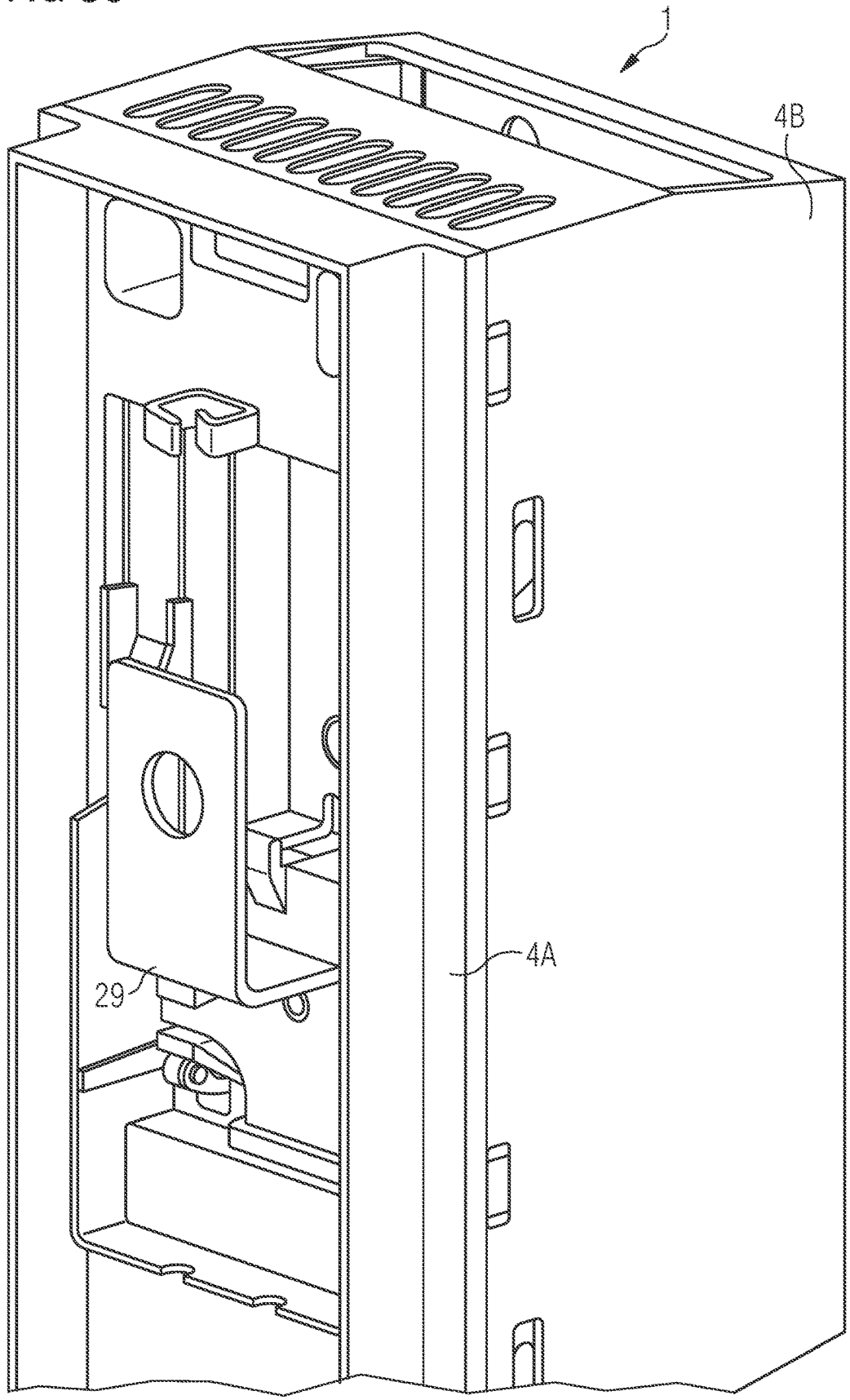
Figure 31:
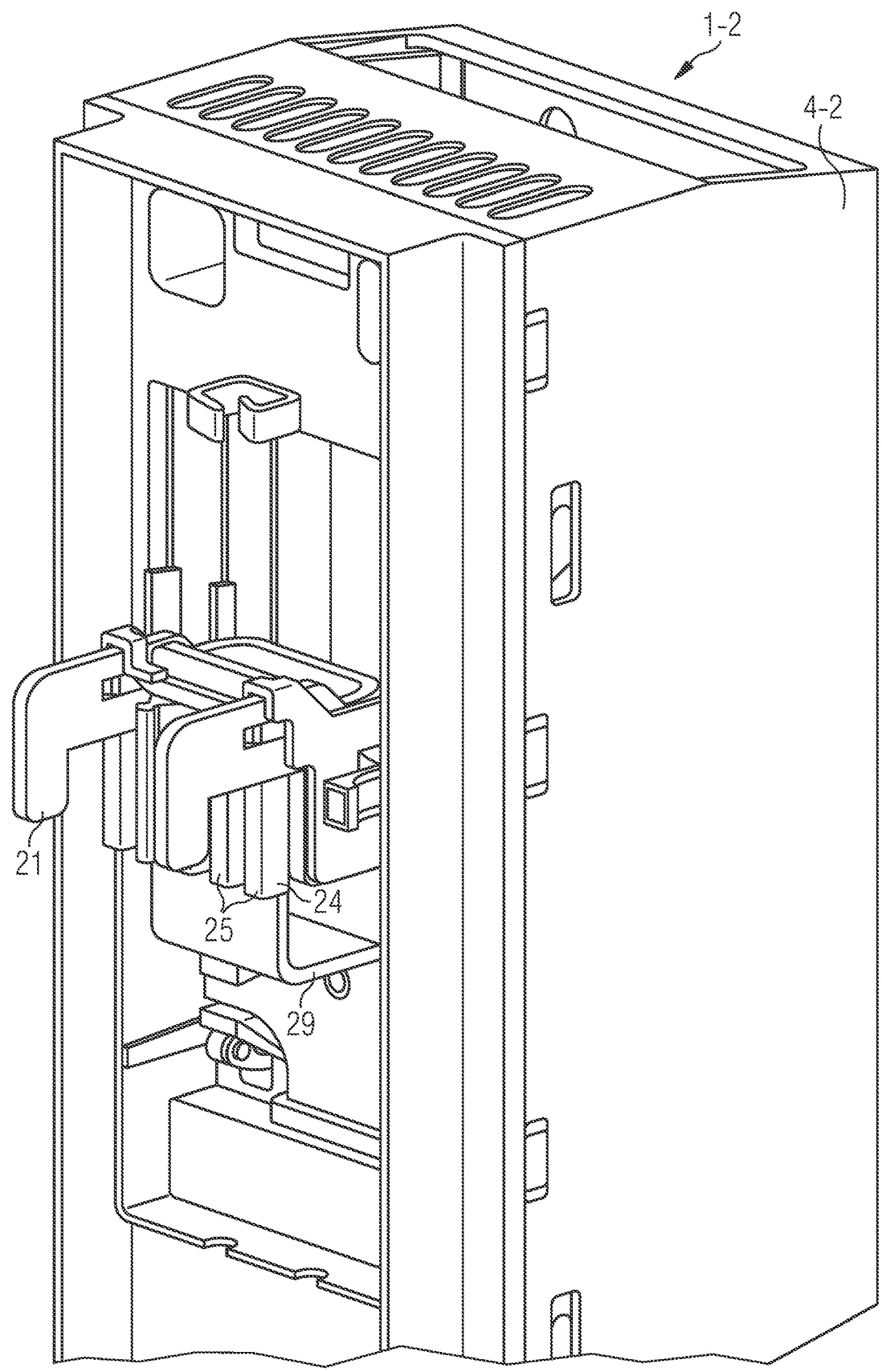
Figure 32:
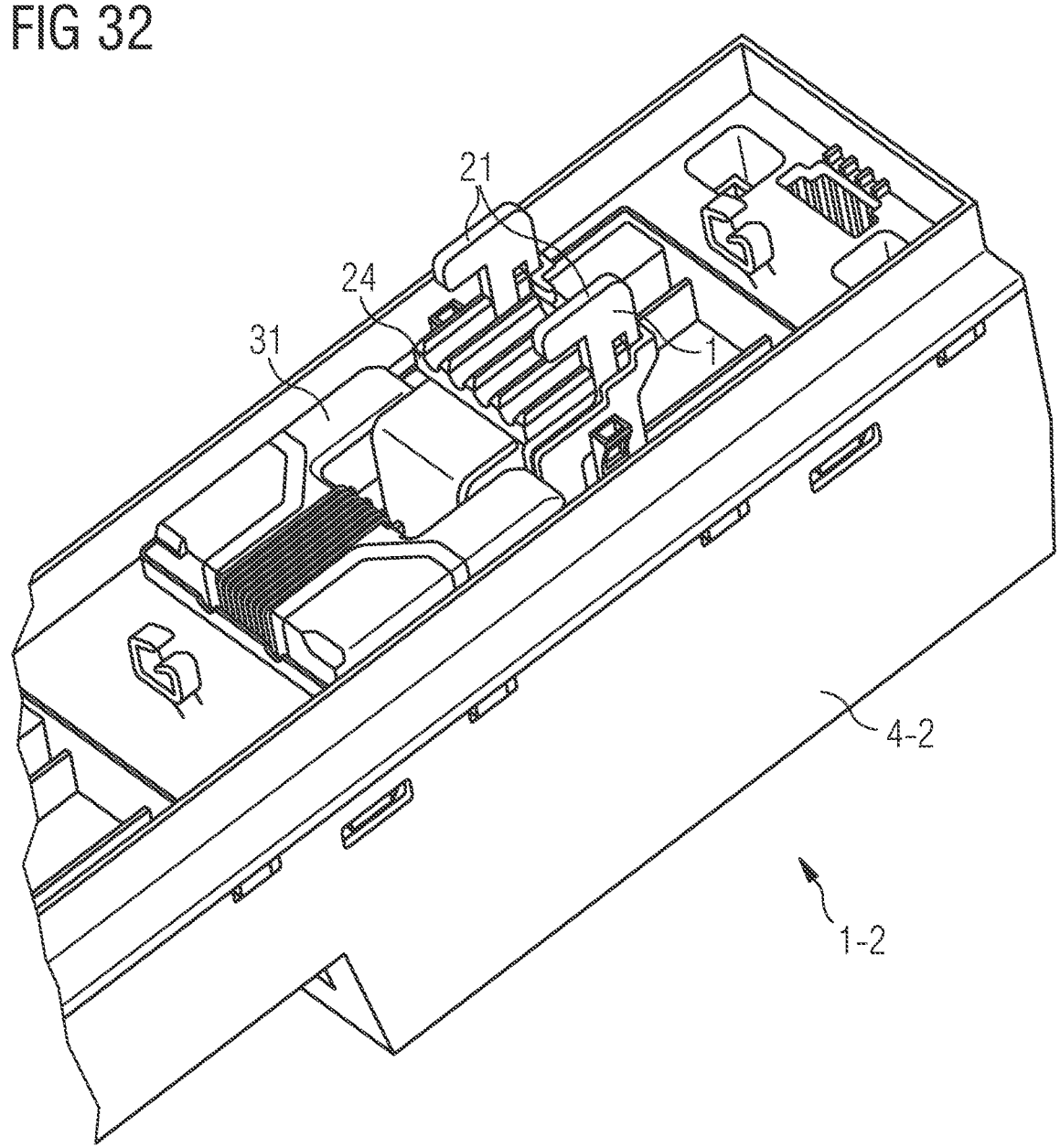
Figure 33:
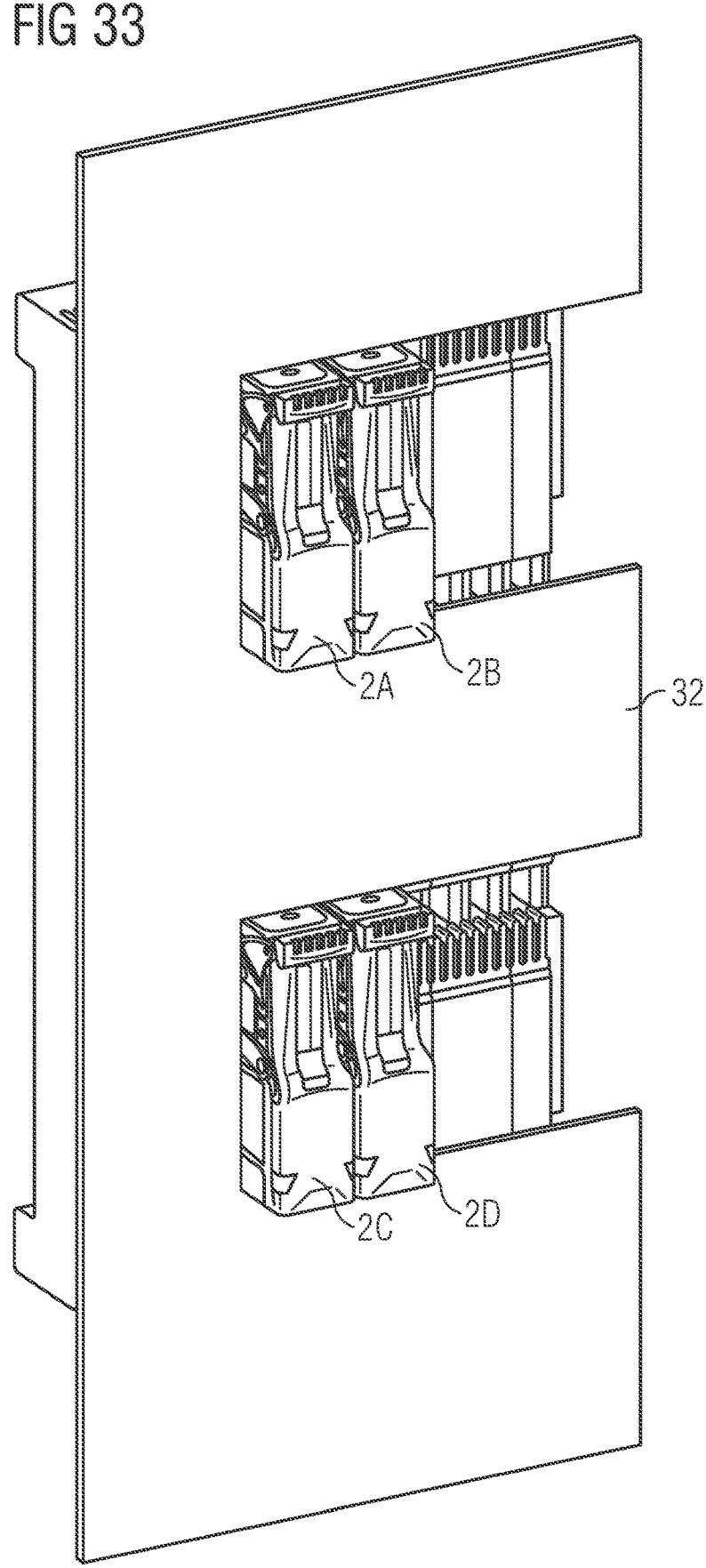
Figure 34:
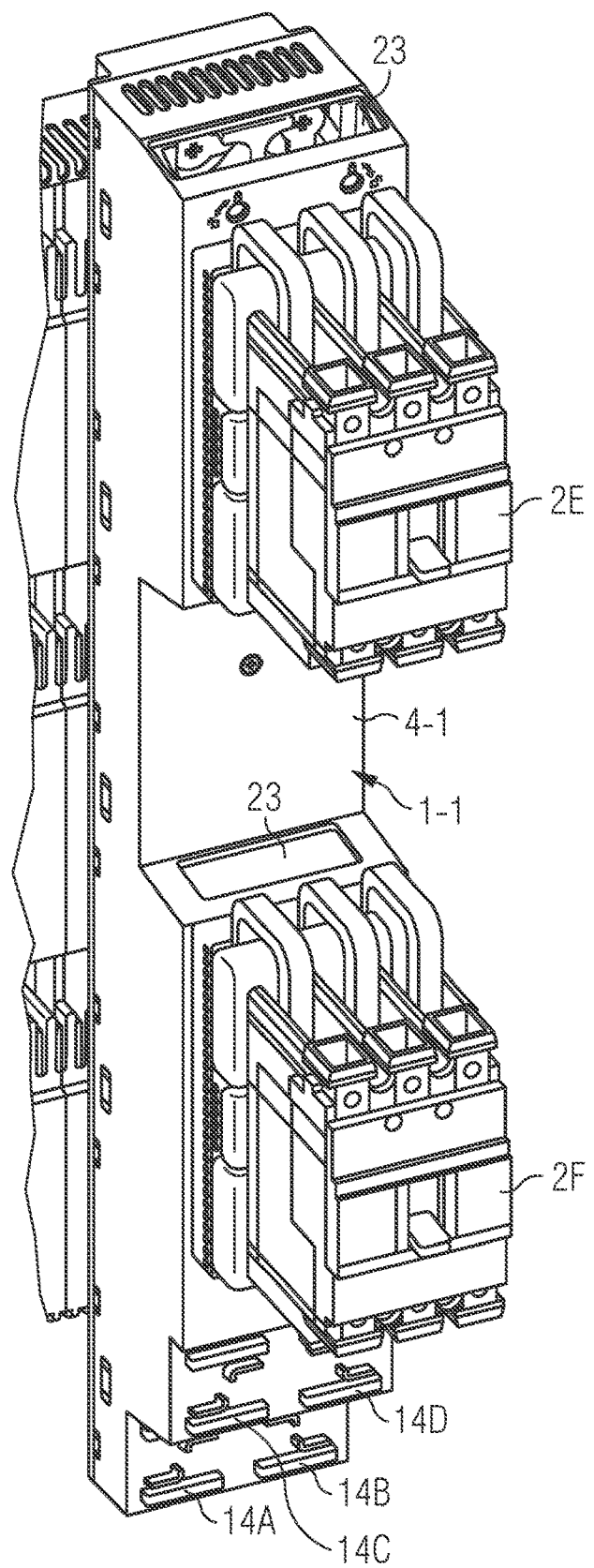
Figure 35:
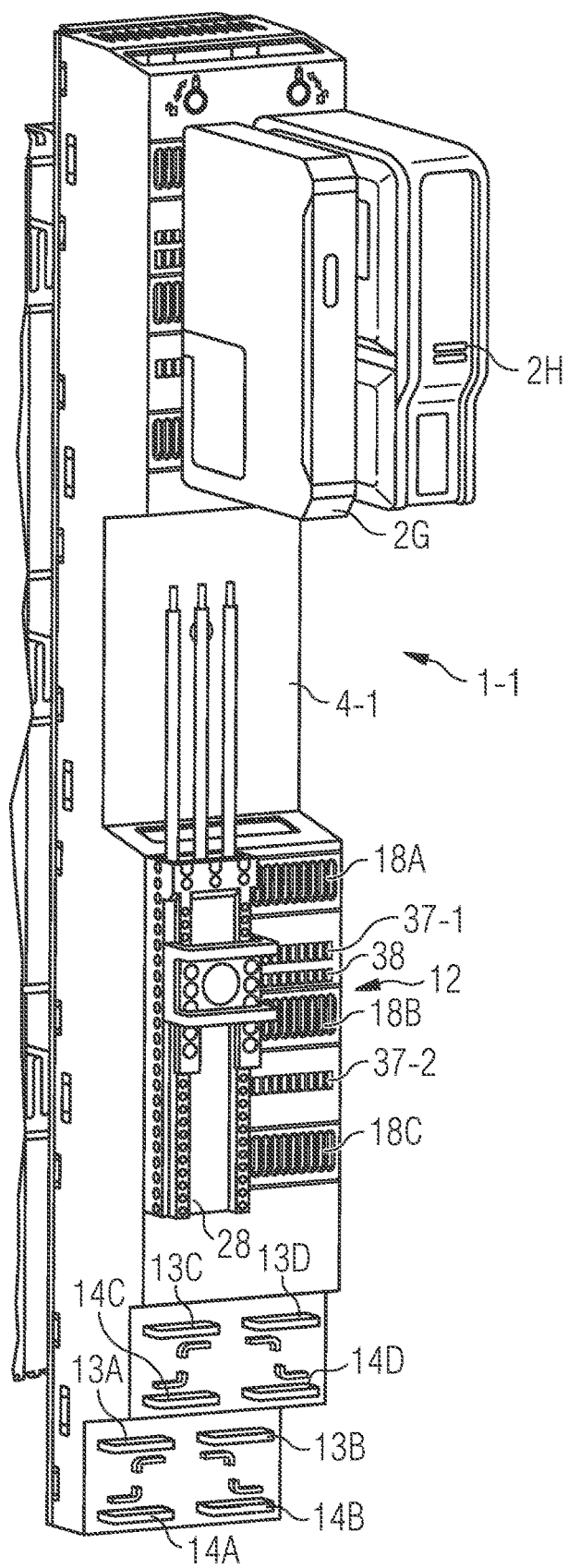
Figure 36:
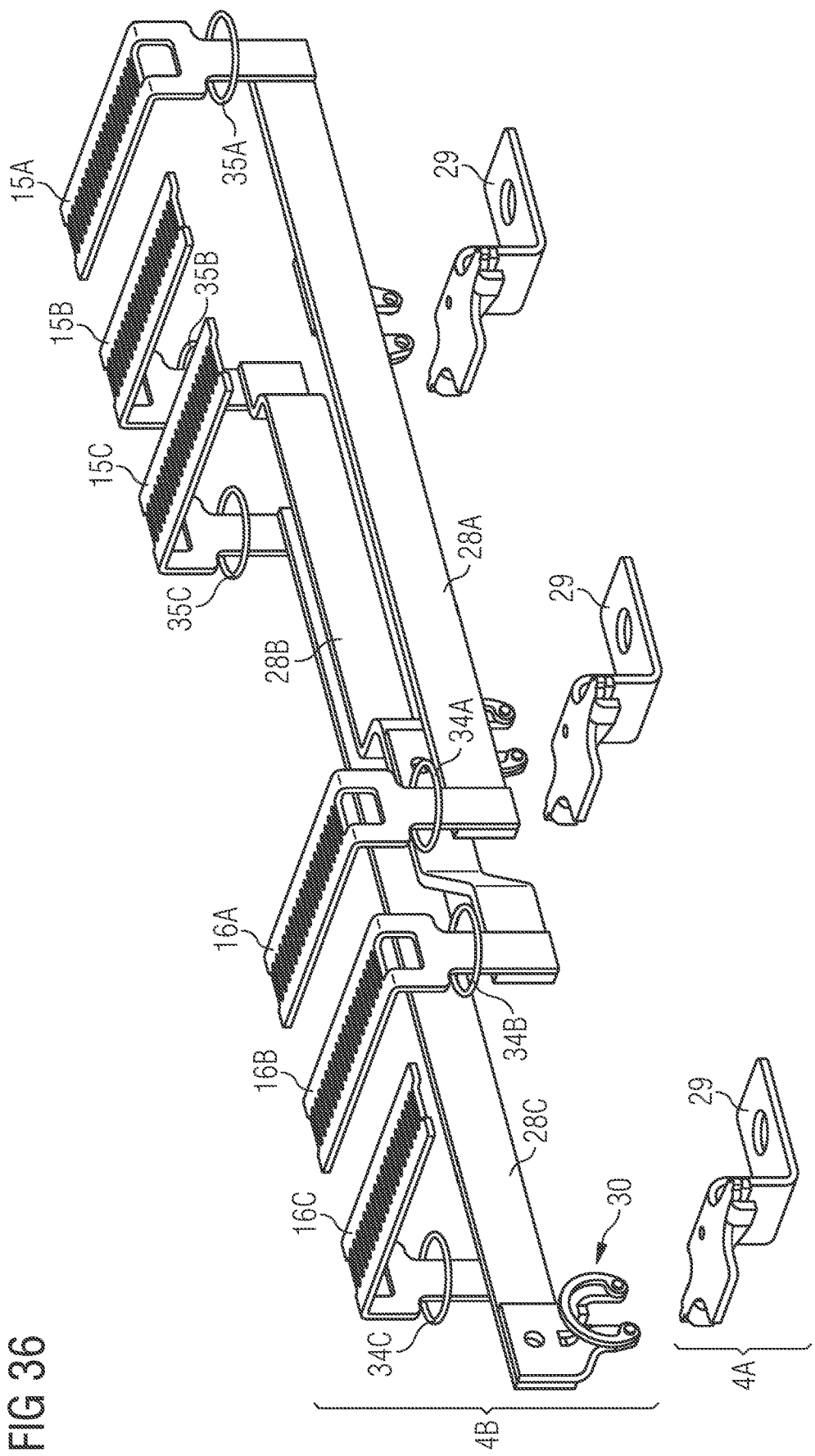
Figure 37:
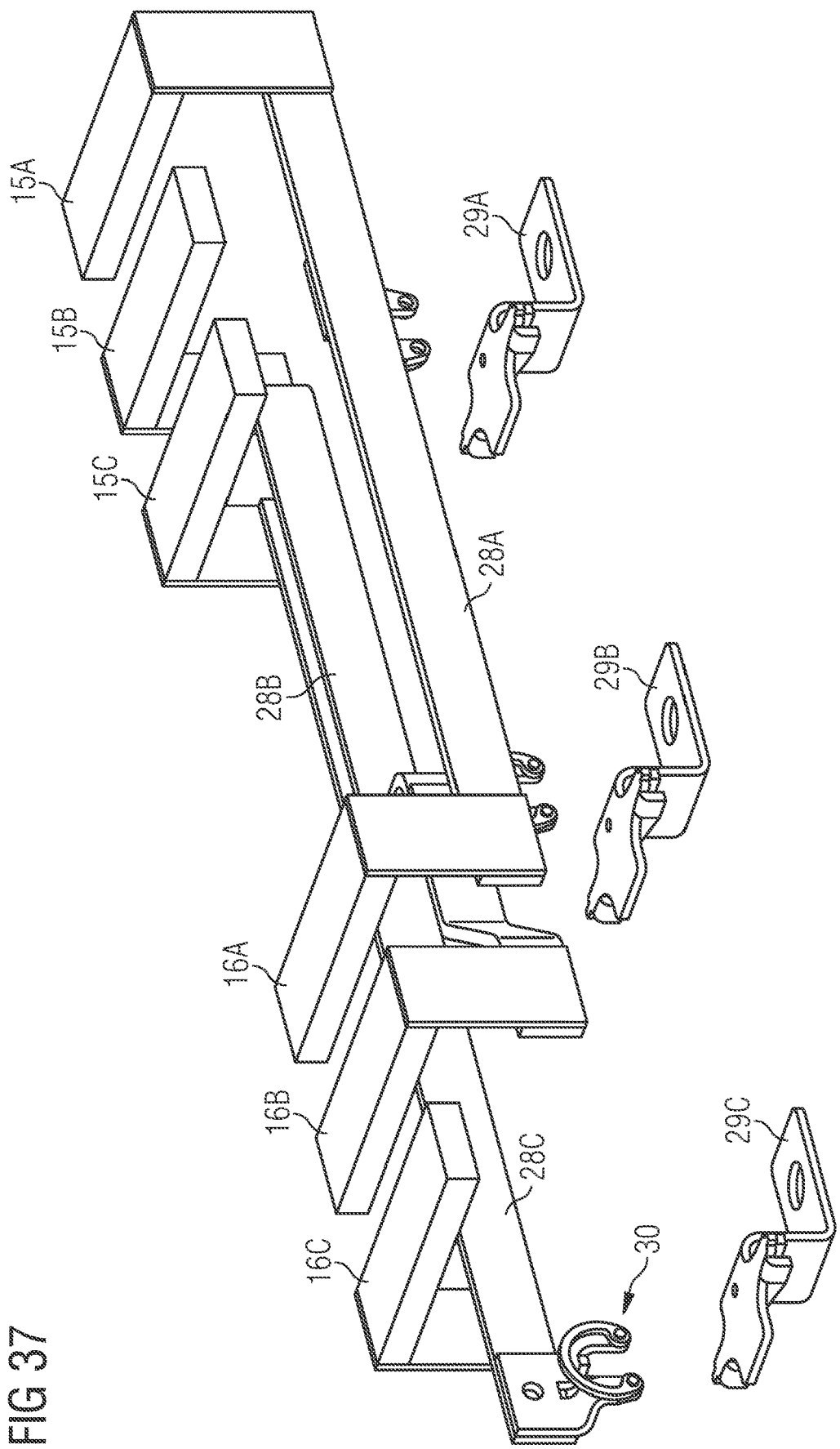
Figure 38:
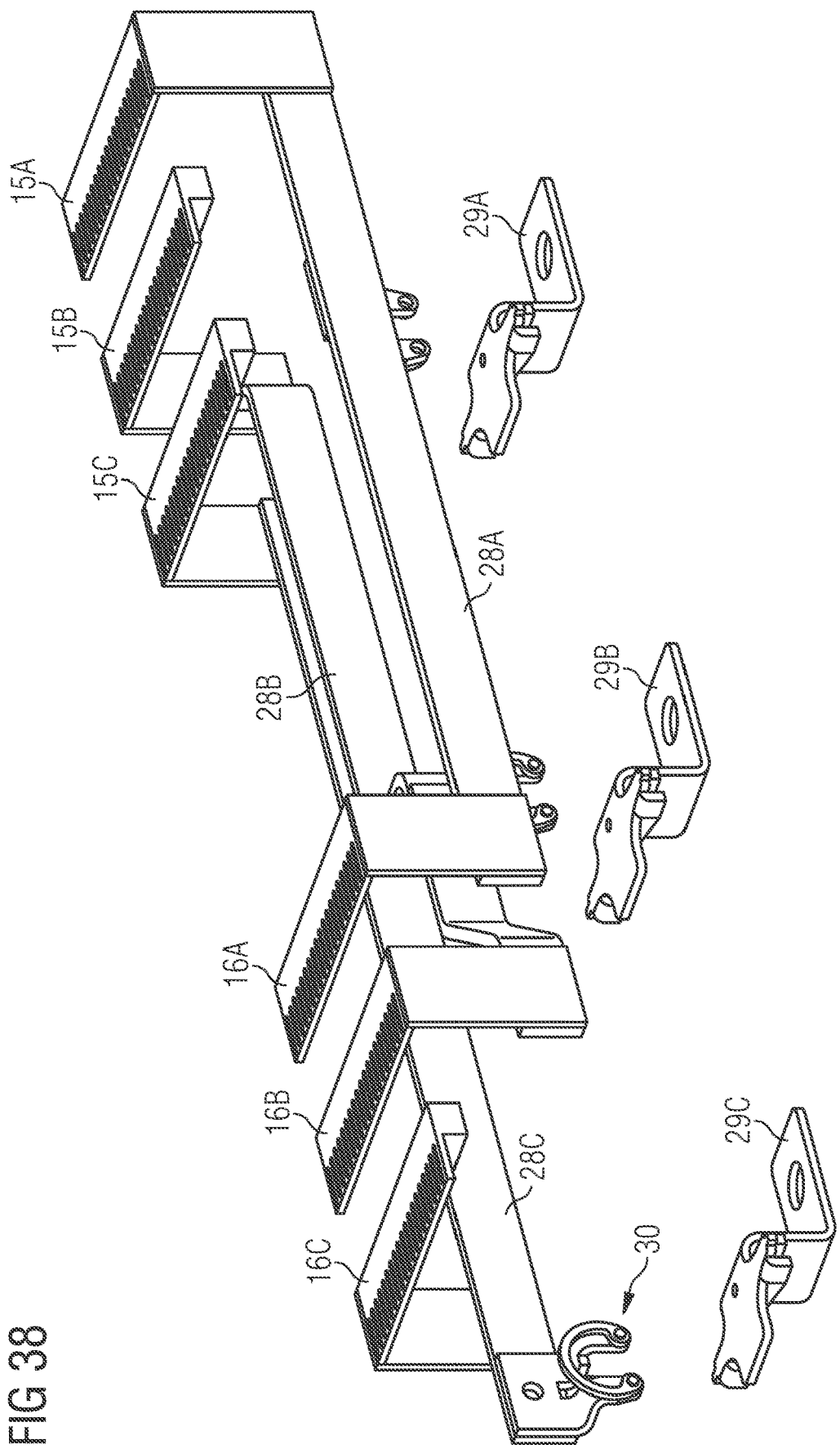
Figure 39:
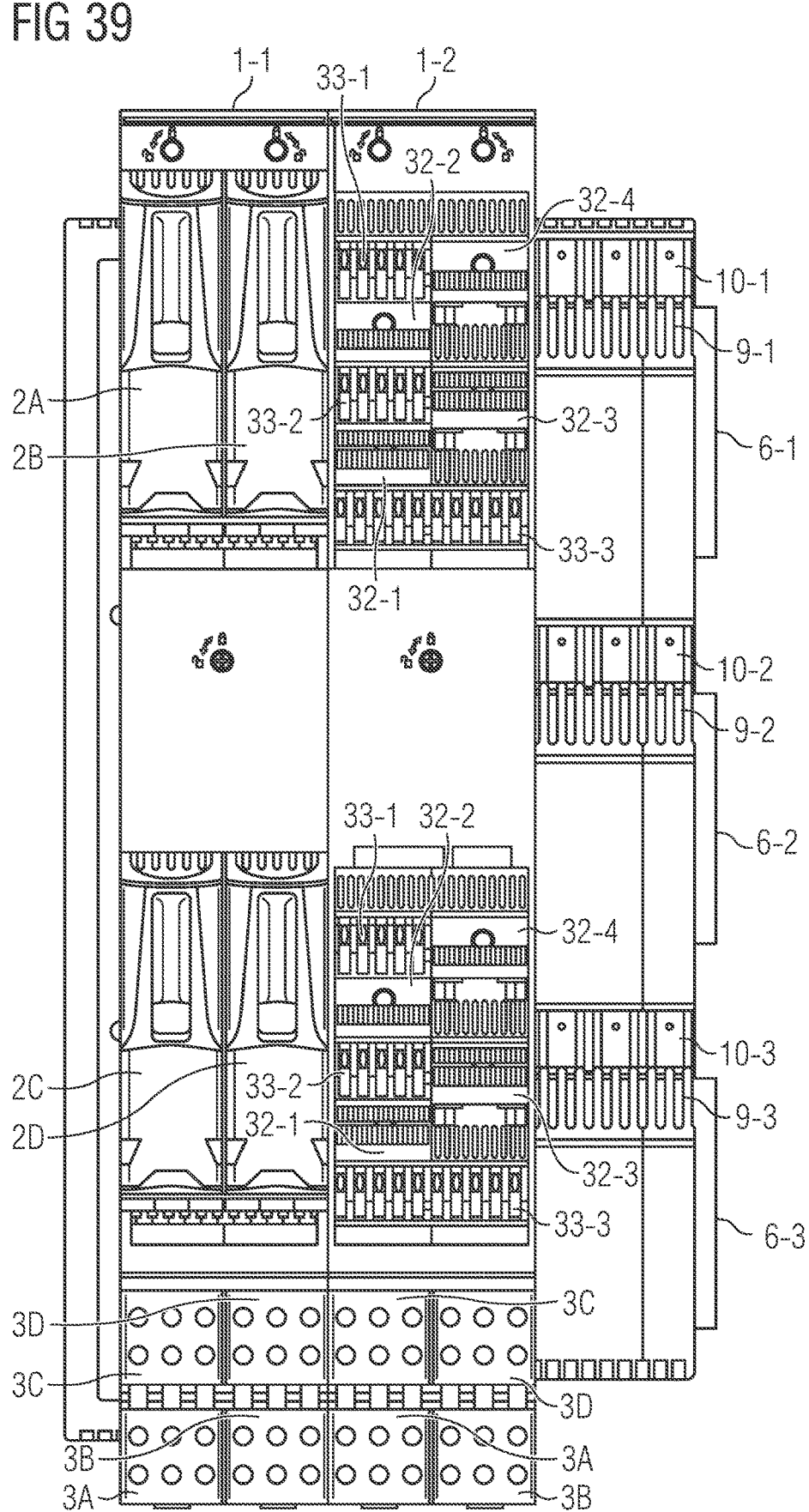
Figure 40:
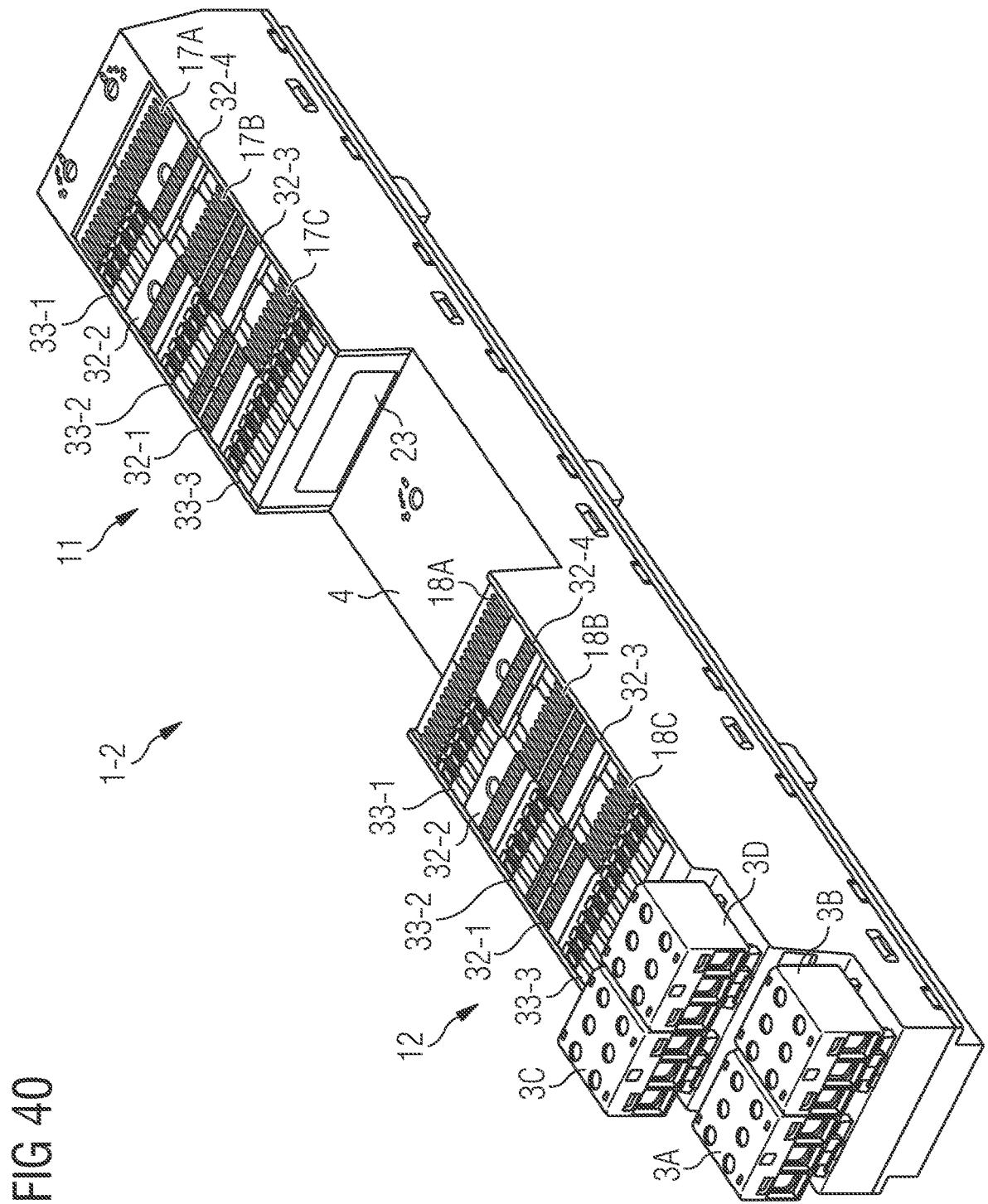
Figure 41:
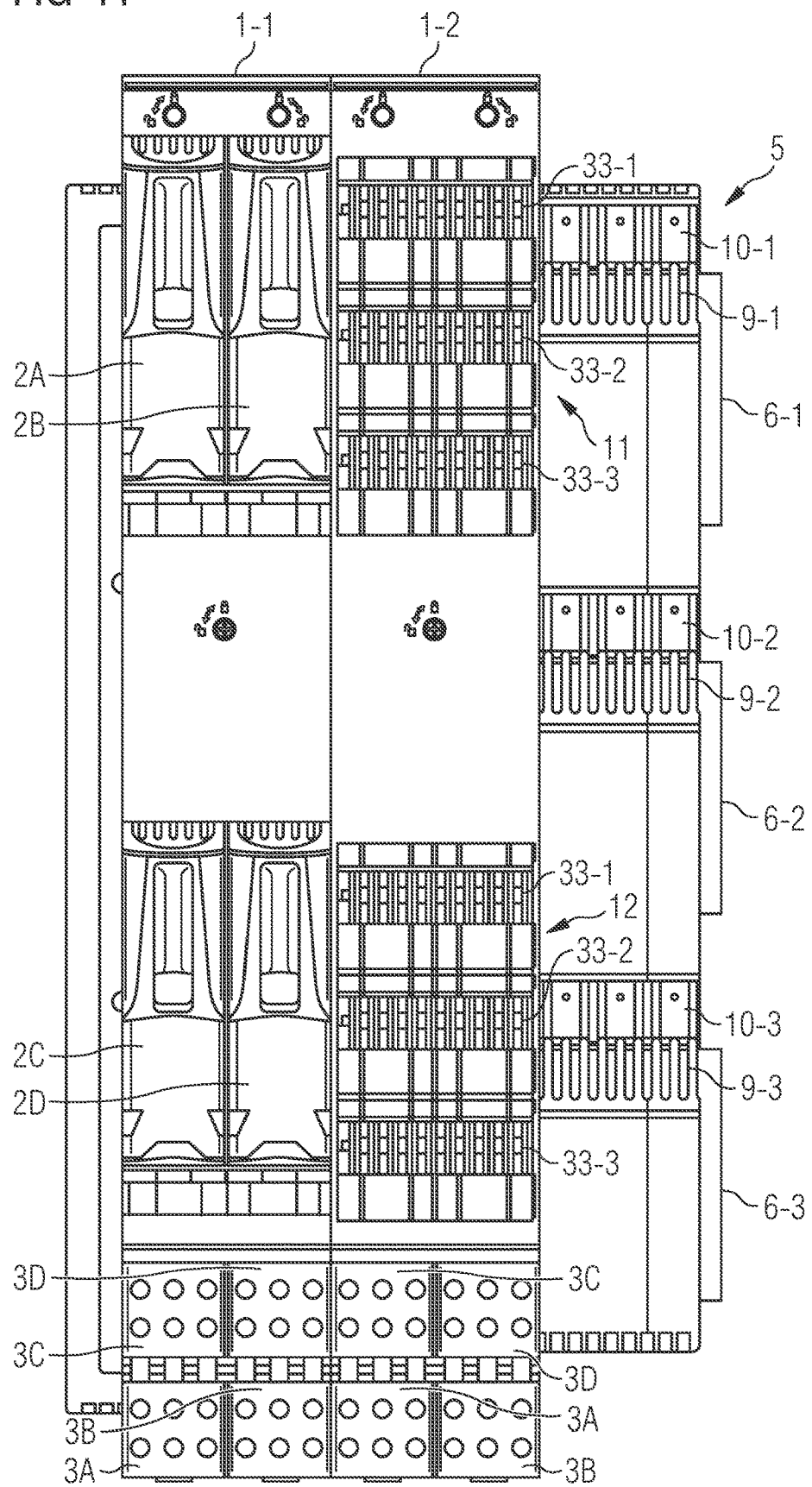
Figure 42:
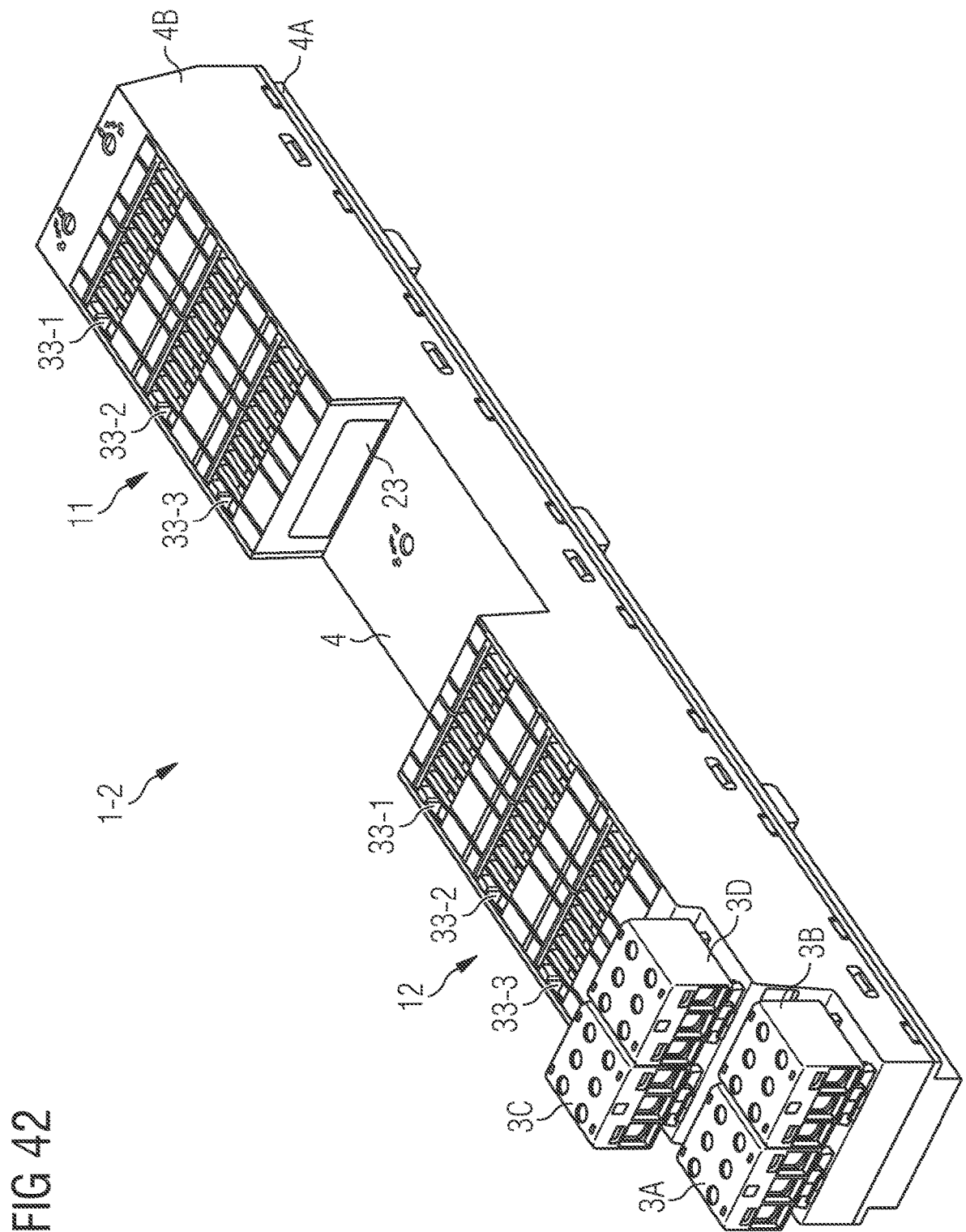

FIG. 14 an isometric view of an adaptor device according to the present invention with four NH000 fuse-switch-disconnectors and four terminal blocks including the outlet lines therebetween;

FIG. 15 is an isometric view of the lower part of the adapter device shown in FIG. 14 with four NH000 fuse-switch-disconnectors and four terminal blocks;

FIG. 16 is a sectional view of an adapter device on a contact-protected busbar system according to the present invention;

FIG. 17 is a sectional view of an adapter device according to the present invention without mounted components or electrical devices;

FIG. 18 is a detailed view showing an interlock between two adapter housing halves of an adapter housing of the adapter device according to the present invention;

FIG. 19 is a sectional view through a line feed-through tunnel, which extends below a bus bar sub-interface of an adapter device according to the present invention;

FIG. 20 is an isometric view from the top left of an exemplary embodiment of an adaptor device according to the present invention without attached components or electrical devices, the upper half of the adaptor housing being separated from the lower half of the adaptor housing;

FIG. 21 is an isometric view of an exemplary embodiment of an adapter device according to the present invention with separated adapter housing halves;

FIG. 22 is another isometric view of an adapter device according to the present invention, the upper half of the adapter housing being rotated by 180° along an axis of rotation;

FIG. 23 is an isometric view of an adapter device without attached components with the upper half of the adapter housing rotated by 180°;

FIG. 24 is an isometric view of an adaptor device of the present invention with four NH00 fuse-switch-disconnectors with the upper half of the adaptor housing rotated by 180°;

FIG. 25 is an isometric exploded view from the bottom left of the assembled adapter device;

FIG. 26 is an isometric exploded view from the bottom right of the assembled adapter device;

FIG. 27 is an isometric view from the bottom left of the complete contact system inside the adapter housing;

FIG. 28 is an isometric view from the bottom right of the complete contact system inside the adapter housing;

FIG. 29 is a detailed isometric view of a plug contact which implements a detachable connection between an adapter lower part and an adapter upper part;

FIG. 30 is an isometric view from top left of an inlet contact area;

FIG. 31 an isometric view of a clamping yoke for contacting a contact-protected busbar system;

FIG. 32 is a detailed isometric view of an inlet contact area with a current measuring device installed;

FIG. 33 is an isometric view of a possible installation of an adapter device according to the present invention in a switch cabinet with indicated switch cabinet cover;

FIG. 34 is an isometric view of an adapter device with further components according to the present invention;

FIG. 35 is an isometric view of an adapter device with further components according to the present invention;

FIG. 36 is an isometric view from the bottom right of the contact system located in the adapter;

FIG. 37 is a perspective view of a possible embodiment of a contact system in the adapter housing with solid busbars of both sub-systems;

FIG. 38 is another perspective view of a further possible embodiment of the contact system inside the adapter with hybrid busbars of the two sub-systems;

FIG. 39 is a front view of an assembly with an equipped and non-assembled adapter device;

FIG. 40 is the assembly shown in FIG. 39 from a perspective view;

FIG. 41 is a further view of a possible assembly according to the present invention with an assembled adapter device and a non-assembled adapter device;

FIG. 42 is a perspective view of the assembly shown in FIG. 41.

Figure 1:
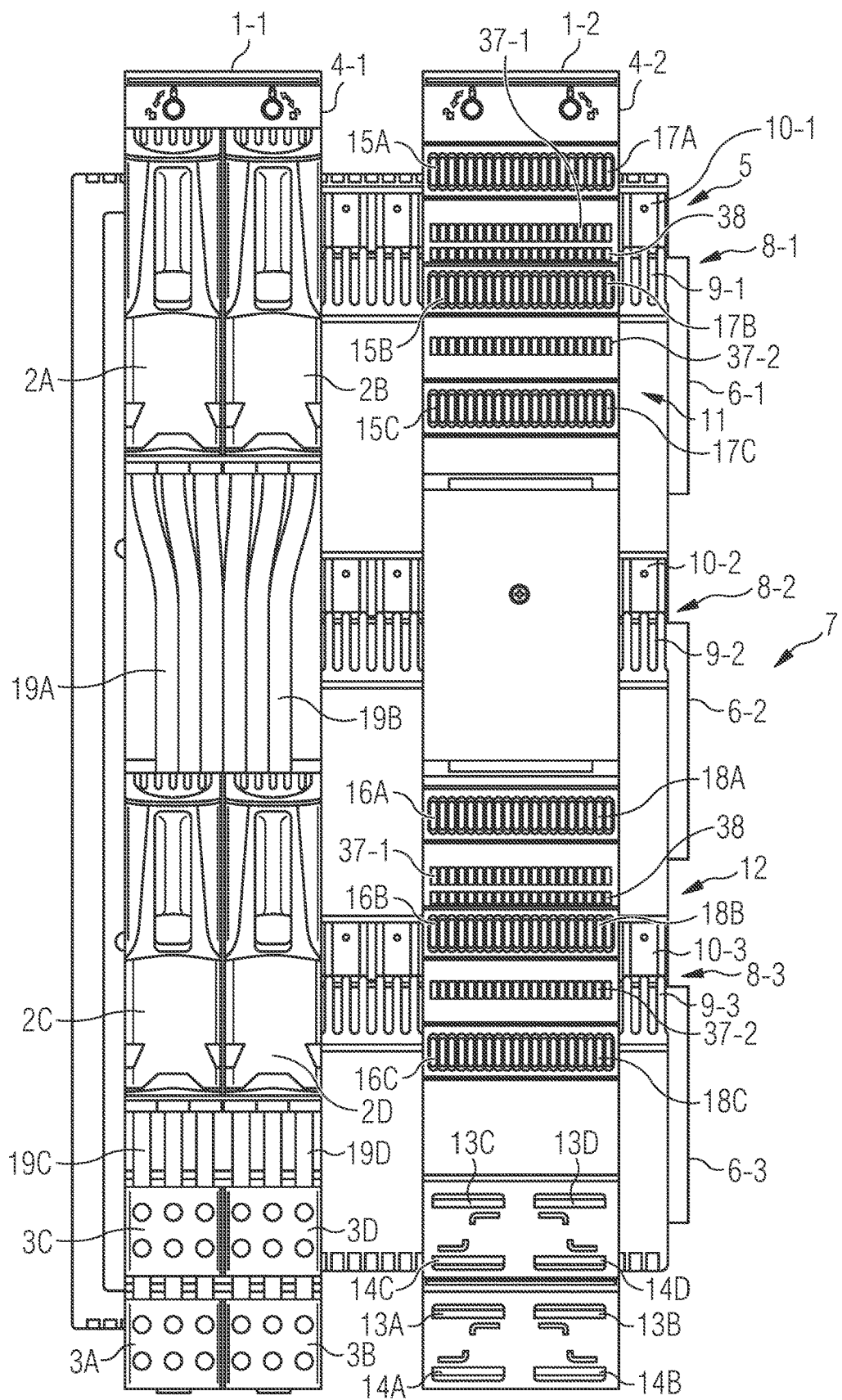
FIG. 1 is an exemplary assembly having two adapter devices mounted on a contact-protection system according to the present invention.

FIG. 1 shows an exemplary assembly in which adapter devices 1 are provided in accordance with the present invention in order to combine or electrically connect different busbar systems. In the exemplary assembly shown in FIG. 1, two adapter devices 1-1, 1-2 are provided. FIG. 1 shows a view of the two adapter devices 1-1, 1-2 from above. In the example shown, the left-hand adapter device 1-1 shown in FIG. 1 is equipped with electrical devices or components 2, and the second adapter device 1-2 shown on the right-hand side in FIG. 1, which is not equipped with electrical devices or components 2. The adapter device 1 according to the present invention serves for connecting at least one electrical device 2, which is adapted for a particular busbar sub-system 11, 12, to a busbar main system 7. In the assembly shown in FIG. 1, the adapter device 1-1 shown is equipped with four electrical devices or electrical components 2A, 2B, 2C, 2D. For each equipped or mounted electrical device 2, an associated terminal block 3 is provided at the bottom of the adapter device 1, as shown in FIG. 1. Accordingly, the adapter device 1-1 shown in FIG. 1 on the left side comprises four terminal blocks 3A, 3B, 3C, 3D, which are connected to the corresponding electrical devices or components 2 via power lines 19. Instead of the power lines or outlet lines 19, a further embodiment may also be provided with power conductors or busbars integrated in the adapter housing 4 of the adapter device 1, which are provided with line connection terminals at sub-system level and at the lower end of the adapter device 1. In this way, the outlet lines of the components may be connected to the line connection terminals of the integrated outlet rails at sub-system level. On the underside of the adapter housing, the outlet lines may be connected to the power loads.

The two adapter devices 1-1, 1-2 each comprise an associated adapter housing 4-1, 4-2. The adapter housing 4 of the adapter device 1 comprises a main busbar interface on the rear side of the housing for electromechanical contacting of busbars 6 of a main busbar system 7. With reference to the exemplary embodiment shown in FIG. 1, the busbars 6 of the main busbar system 7 are located in a contact-protection system 5. The electrically insulating contact-protection system 5 encloses the busbars 6 of the main busbar system 7. The contact-protection system 5 may comprise a modular embodiment and may comprise several contact-protection modules. These contact-protection modules comprise, for example, support feet which are provided for gripping behind the busbars 6. The various contact-protection modules of the contact-protection system 5 may be interlocked with adjacent contact-protection modules and may cover the busbars 6-$i$ of the main busbar system 7. In the embodiment shown in FIG. 1, the various contact-protection modules of the contact-protection system 5 comprise terminal connection areas 8-$i$ for accommodating connection terminals. These connection terminals are provided for the electrical contacting of the busbars 6-$i$ of the main busbar system 7 located below the contact-protection modules of the contact-protection system 5. In the exemplary embodiment shown in FIG. 1, the contact-protection system 5 is provided for three parallel busbars 6-1, 6-2, 6-3 of the main busbar system 7. Accordingly, each contact-protection module of the contact-protection system 5 comprises three terminal connection areas 8 1, 8-2, 8-3. In the exemplary assembly shown, the busbars 6 may be mounted on a wall or inside an enclosure or switch cabinet, for example by means of busbar supports 26. In the exemplary embodiment shown in FIG. 1, the busbars 6-$i$ of the main busbar system 7 extend in a horizontal direction. For example, the busbars 6 of the main busbar system 7 may be solid busbars with a rectangular cross-section, which allows supply of electrical currents with a high nominal current intensity. The various contact-protection modules of the contact-protection system 5 may, in a possible embodiment, be pushed onto the several busbars 6-$i$ arranged in parallel in the horizontal direction in such a way that the support feet of the contact-protection modules engage behind the busbars 6. In the exemplary embodiments shown in FIG. 1, the various terminal connection areas 8-$i$ comprise parallel contact slots 9 as shown in FIG. 1. The contacting slots 9 are used for the electrical contacting of the busbars 6 located underneath by means of connection terminals or connection components. The contacting slots 9 are preferably adapted in such a way that they provide a uniform arrangement of several interlocked contact-protection modules of the contact-protection system 5. Furthermore, the terminal connection areas 8-1, 8-2, 8-3 of the exemplary embodiment shown in FIG. 1 comprise flat, beveled insertion devices 10-$i$, which are provided for the insertion of terminal clamps. The various modules of the contact-protection system 5 are preferably made of an electrically insulating, heat-stable and fire-retardant material. In the exemplary embodiment shown in FIG. 1, the main busbar system 7 is a contact-protected 185 mm busbar system for supply of high electrical power.

Each of the two adapter devices 1-1, 1-2 comprises an adapter housing 4-1, 4-2, which is also made of an electrically insulating material. The adapter housing 4 of the adapter device 1 comprises a main busbar interface on the rear side of the housing for electromechanical contacting of busbars 6 of the main busbar system 7. Furthermore, the adapter housing 4 of the adapter device 1 comprises one or more sub-busbar interfaces on the front side of the housing. These busbar sub-interfaces are used for placing at least one electrical device 2 on the adapter device 1 from the front and for its electrical connection to the main busbar system 7 via the busbars of the respective busbar sub-systems 11, 12 integrated in the adapter housing 4 and via electrical lines or rails 28 extending or contained in the adapter housing 4.

In the exemplary embodiment shown in FIG. 1, the adapter device 1 comprises two busbar sub-systems 11, 12 with corresponding sub-interfaces on its front side. The exemplary embodiment shown in FIG. 1 is a sub-system comprising slotted busbars. As shown in FIG. 1, each of the two adapter devices 1-*i* comprises a first upper busbar sub-system 11 and a second lower busbar sub-system 12. The adapter device 1-1 shown on the left in FIG. 1 is fully equipped with electrical devices or components 2A to 2D. Two first electrical components or devices 2A, 2B are placed on the upper busbar sub-interface of the busbar sub-system 11 and the two electrical devices 2C, 2D are placed on the busbar sub-interface of the second busbar sub-system 12. Each busbar sub-interface is suitable for accommodating at least one electrical device 2, for example a fuse-switch-disconnector. For each electrical device 2 fitted, a corresponding terminal block 3 may be provided, as shown in FIG. 1 for the left-hand adapter device 1-1. These terminal blocks 3 may be mounted or pushed onto mounting rails 13, 14. For example, for each terminal block 3, two mounting rails or top-hat rails may be provided for attaching the corresponding terminal block 3. In the assembly shown in FIG. 1, the adapter device 1-2 on the right side is not equipped with electrical devices 2 and does not have the corresponding terminal blocks 3, so that the mounting rails 13, 14 may be seen from the front in FIG. 1. In the exemplary embodiment shown in FIG. 1, the mounting rails 13, 14 for attaching the connection terminal blocks 3 are located at the lower front side of the adapter housing 4 of the adapter device 1.

In the example shown, the adapter housing 4 comprises two busbar sub-interfaces of the two busbar sub-systems 11, 12 on its front side. These are used for placing at least one electrical device on the adapter device 1 and for its electrical connection to the busbars 6 of the main busbar system 7 extending on the rear side within the contact-protection system 5. This electrical connection is established on the one hand via the busbars 15, 16 of the respective busbar sub-systems 11, 12 integrated in the adapter housing 4, and on the other hand via internal electrical lines or rails 28 extending in the adapter housing 4. In the exemplary embodiment shown in FIG. 1, the busbars 15, 16 integrated in the adapter housing 4 each comprise hybrid busbars. In the exemplary embodiment shown, the first upper busbar sub-system 11 comprises three busbars 15A, 15B, 15C integrated in the adapter housing. The second lower busbar sub-system 12 also comprises three parallel integrated busbars 16A, 16B, 16C, which extend parallel underneath the contact slots 17, 18, which may be seen from the front in FIG. 1. The busbars 15, 16 of the sub-systems 11, 12 may include slot busbars (FIG. 26, FIG. 27, FIG. 36), solid busbars (FIG. 37) or hybrid busbars (FIG. 38). The number of busbars 15, 16 of the two busbar sub-interfaces 11, 12 may correspond to the number of busbars 6-*i* of the main busbar system 7 in a possible embodiment. Each busbar 15, 16 of the two busbar sub-interfaces of the busbar sub-systems 11, 12 preferably comprises a live rail profile and a contact receiving rail profile. The current-carrying rail profile of the busbar 15, 16 integrated in the adapter housing 4 is mainly used for carrying an electric current. The contact-receiving rail profile of the busbar 15, 16 is preferably provided with evenly spaced contact slots or contact openings to receive protruding electrical contacts of an electrical device 2. The wall on the front side of the adapter housing 4 comprises feed-through slots 17A, 17B, 17C or 18A, 18B, 18C in the area of the busbar sub-interfaces. These feed-through slots 17, 18 are used to feed through the electrical contacts of an electrical device 2 to be connected, which may be inserted or plugged into the contact slots of the busbar 15, 16 integrated in the adapter housing 4. In this way, an electrical contact of an electrical device 2 with the busbars 15, 16 of the respective busbar sub-system 11, 12 may be achieved, which in turn are internally electrically connected to the respective busbars 6-1, 6-2, 6-3 of the busbar main system 7 via integrated lines or brackets. In this way, electrical devices 2, which are plugged into a busbar sub-interface, are electrically connected to the busbars 6 of the main busbar system 7 contained in the contact-protection system 5.

As shown in FIG. 1, the adapter housing 4 of the adapter device 1 is configured to be elongated. The adapter housing 4 may comprise several contact components arranged one above the other on the rear side of the housing along its longitudinal axis for contacting the busbars 6-*i* of the main busbar system 7 extending parallel in a horizontal direction.

The adapter housing 4 of the adapter device 1 preferably comprises two separable adapter housing halves which are mechanically connected to each other. The two adapter housing halves comprise a first adapter housing half 4A on the rear side of the adapter housing 4, and a second adapter housing half 4B on the front side of the adapter housing 4. The first adapter housing half 4A on the rear side of the adapter housing 4 comprises a main busbar interface for electromechanical contacting of the busbars 6 of the main busbar system 7. The second half of the adapter housing 4B at the front of the adapter housing 4 comprises the various busbar sub-interfaces of the busbar sub-systems 11, 12 with busbars 15, 16 of the two busbar sub-systems 11, 12 integrated in the adapter housing 4 or busbars of busbar sub-systems attached to the adapter housing 4.

The main busbar interface provided on the rear side of the adapter housing 4 comprises for each busbar 6 of the main busbar system 7 preferably an associated contact component for contacting the corresponding busbar 6 of the main busbar system 7. Preferably several busbars 15, 16 of different busbar sub-systems 11, 12 provided on the front side of the adapter housing 4 are electrically connected in parallel to this contact component via the lines contained in the adapter housing 4 of the adapter device 1. For the busbar system shown in FIG. 1, the main busbar system 7 comprises a number of three busbars 6 for different current phases L1, L2, L3, which extend parallel to one another in the horizontal direction and which may each be electromechanically contacted by at least one contact component of the main busbar system 7 provided on the rear side of the adapter housing 4 for electrical connection to a corresponding number of two busbars 15, 16 of the two busbar sub-systems 11, 12 integrated in the adapter housing 4 on the front side of the housing. For example, the first busbar 6-1 shown in FIG. 1 above carries a current phase L1 and is connected via the adapter device 1 on the one hand to the busbar 15A of the upper busbar sub-system 11, and on the other hand to the busbar 16A of the lower busbar sub-system 12. In the same way, the busbar 6-2 of the main busbar system 7 may be electrically connected via the adapter device 1 simultaneously in parallel with the second busbar 15B of the upper busbar sub-system 11 and with the second busbar 16B of the lower second busbar sub-system 12. Furthermore, the third lower busbar 6-3 of the main busbar system 7 is connected in parallel in the same way to the two busbars 15C, 16C of the two busbar sub-systems 11, 12 integrated in the adapter housing 4. The electrical current flowing through busbar 6-$i$ of the main busbar system 7 may thus be easily splitted between two or more busbar sub-systems 11, 12. In the example shown in FIG. 1, the busbars 15, 16 of the busbar sub-systems 11, 12 include slot busbars. Alternatively the busbars 15, 16 of the busbar sub-systems 11, 12 may also have conventional solid busbars or hybrid busbars, where the current-carrying cross-section may differ from the cross-section of the busbars 6-$i$ of the main system 7. The number of busbar sub-systems 11, 12 may vary depending on the application. For example, the adapter device 1 may also include three or more busbar sub-systems 11, 12. The distance between the busbars 15, 16 of the busbar sub-systems 11, 12 may be 40 or 60 mm. For example, the main busbar system 7 may be a 185 mm power system or a different system, for example a 60 mm system or a 100 mm system. The mounted or fitted electrical devices 2 may be of various types, such as fuse-switch disconnectors or other electronic equipment, such as motor starters or similar.

On the sub-system, adapters for circuit breakers, circuit breakers, motor starters and other components may be mounted. FIG. 34 shows, for example, two circuit breakers 2E, 2F, which are mounted on the sub-systems using two adapters.

The electrical devices 2 mounted on the busbar sub-interfaces may comprise outlet lines 19, which are routed through feed-through tunnels 23 from busbar sub-interfaces in the direction of the longitudinal axis of the adapter housing 4 to an end face of the adapter housing 4. For example, the electrical devices 2A, 2B, 2C, 2D of the adapter device 1-1 shown in FIG. 1 have 4 groups of outlet lines 19A, 19B, 19C, 19D extending down along the longitudinal axis of the adapter housing 4 to the lower face, each group comprising three outlet lines 19 per device 2 (i.e., a total of 3×4=12 outlet lines 19). On the lower front side of the adapter housing 4, the mounting rails 13, 14 are located for attaching the associated terminal blocks 3A to 3D. In the example shown in FIG. 1, the adapter device 1-1 shown on the left is equipped with four electrical fuse-switch disconnectors 2A to 2D. These are connected between the busbars 6 of the busbar main system 7 and the busbars 15, 16 of the busbar sub-systems 11, 12 on the one hand, and electrical power loads on the other hand. The electrical power loads (not shown in FIG. 1) are connected to terminals 27 of the terminal blocks 3A to 3D and may be disconnected or connected to the busbar systems by means of the fuse-switch disconnectors 2 shown in FIG. 1. For this purpose, the fuse-switch disconnectors 2A to 2D are equipped with manually operated levers 20, which may be operated by an operator. For example, in the upper position of the lever 20, the power loads not shown permanently connected to the terminal blocks 3A to 3D are connected to the busbar sub-systems 11, 12, and draw an electrical current I from the busbar sub-systems 11, 12. If the lever 20 of the fuse-switch-disconnector 2 is pulled down by an operator, the associated power load is disconnected from the associated busbar sub-systems 11, 12 and thus also from the main busbar system 7. The busbars 6 of the busbar main system 7 have a nominal current intensity, which is different from the nominal current intensity of the busbars of the busbar sub-systems 11, 12. For example, busbars 6 of the main busbar system 7 are rated at 630 amps, while hybrid busbars 15, 16 of the busbar sub-systems 11, 12 are rated at 160 amps. In the adapter housing 4 of the adapter device 1, associated measuring units or measuring equipment may be provided for each busbar. These measuring units include, for example, current measuring units and/or voltage measuring units. For example, a current transformer or other current measuring device may be installed at the inlet busbars, which comprise a sum current of the two busbar sub-systems 11, 12. Furthermore, a partial current per busbar sub-system 11, 12 may be measured. Furthermore, the electrical currents per outlet may be measured with a current measuring device. Depending on the configuration, current measurements may be implemented for different current outlets to electrical power loads. The contacting of the current busbars may be achieved in different ways, for example by screw connections, clamping contacts for contact-protected current busbars and/or by means of clamping contacts for non-contact-protected current busbars. In a possible embodiment, a clamping contact may be clamped with a screw or comprises a self- or externally spring-loaded busbar contact.

The mounting rails or top-hat rails 13A to 13D or 14A to 14D may be used to attach not only terminal blocks 3 but also other accessories, such as current measuring devices or line brackets etc. Furthermore, panels may be provided at the front of the adapter housing 4 to form a closed surface within a switch cabinet. In case of further possible embodiments of the adapter device 1 according to the present invention, further measuring units may be integrated within the adapter housing 4, for example for measuring voltage, current or temperature or for fuse monitoring of the fuse of a fuse-switch disconnector 2 on the sub-system. Furthermore, bus lines for data exchange from and to the electrical power loads may be provided in the adapter device 1 according to the present invention. In a further possible embodiment, several adapter devices 1 may be electrically and/or mechanically connected to each other.

Figure 2:
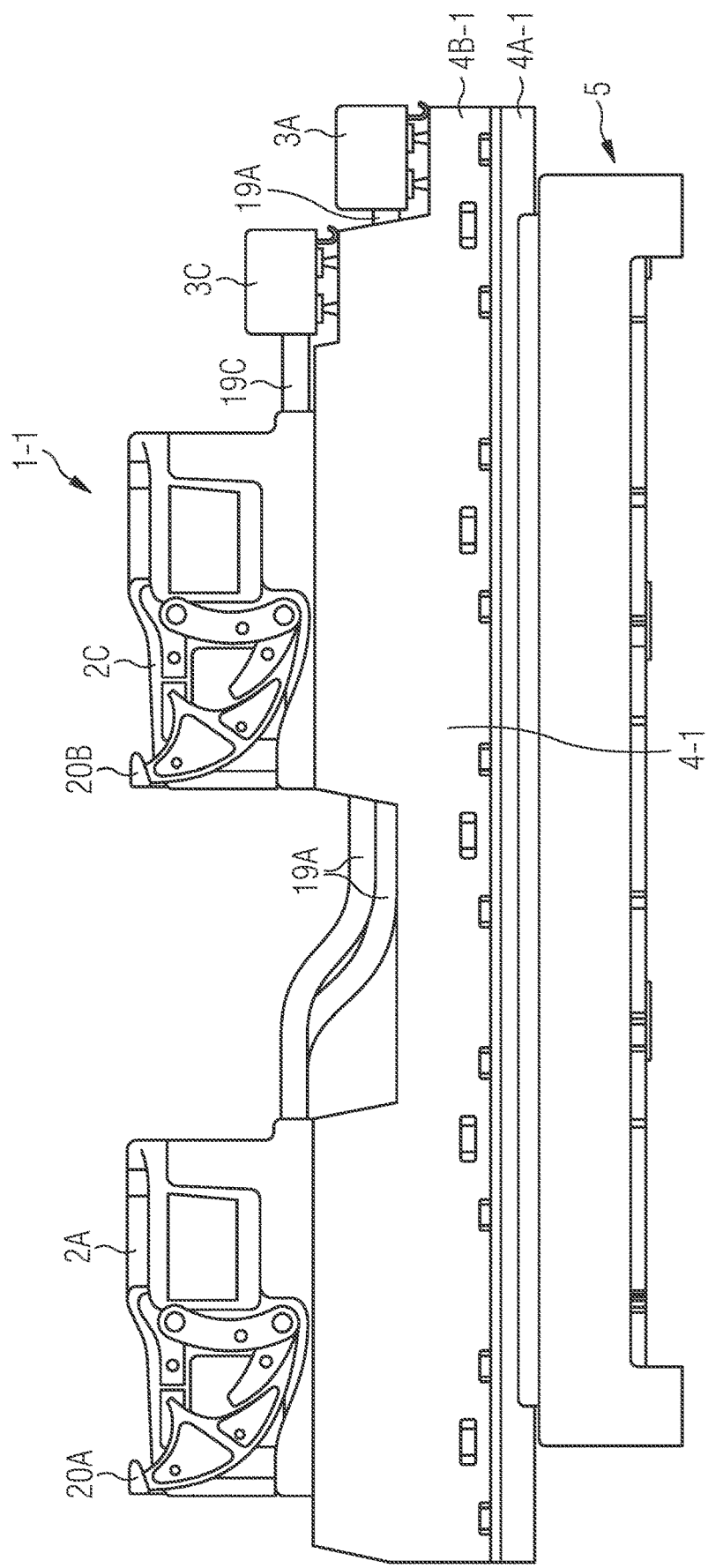
FIG. 2 is a side view from the left side of the assembly shown in FIG. 1.

FIG. 2 shows a side view of the assembly shown in FIG. 1 from the left. Shown in FIG. 2 is the adapter device 1-1, which is mounted on a contact-protection system 5, which encloses the busbars 6-$i$ of the busbar main system 7. On the housing 4-1 of the adapter device 1-1, electrical devices 2A, 2C, namely load break switches, are mounted, which are connected via lines 19A, 19C with corresponding terminal blocks 3A, 3C. Electrical power loads may be connected to the terminal blocks 3A, 3C. The two load-break switches 2A, 2C each comprise an operable lever 20A, 20B for switching an electrical power load to the busbar system.

Figure 3:
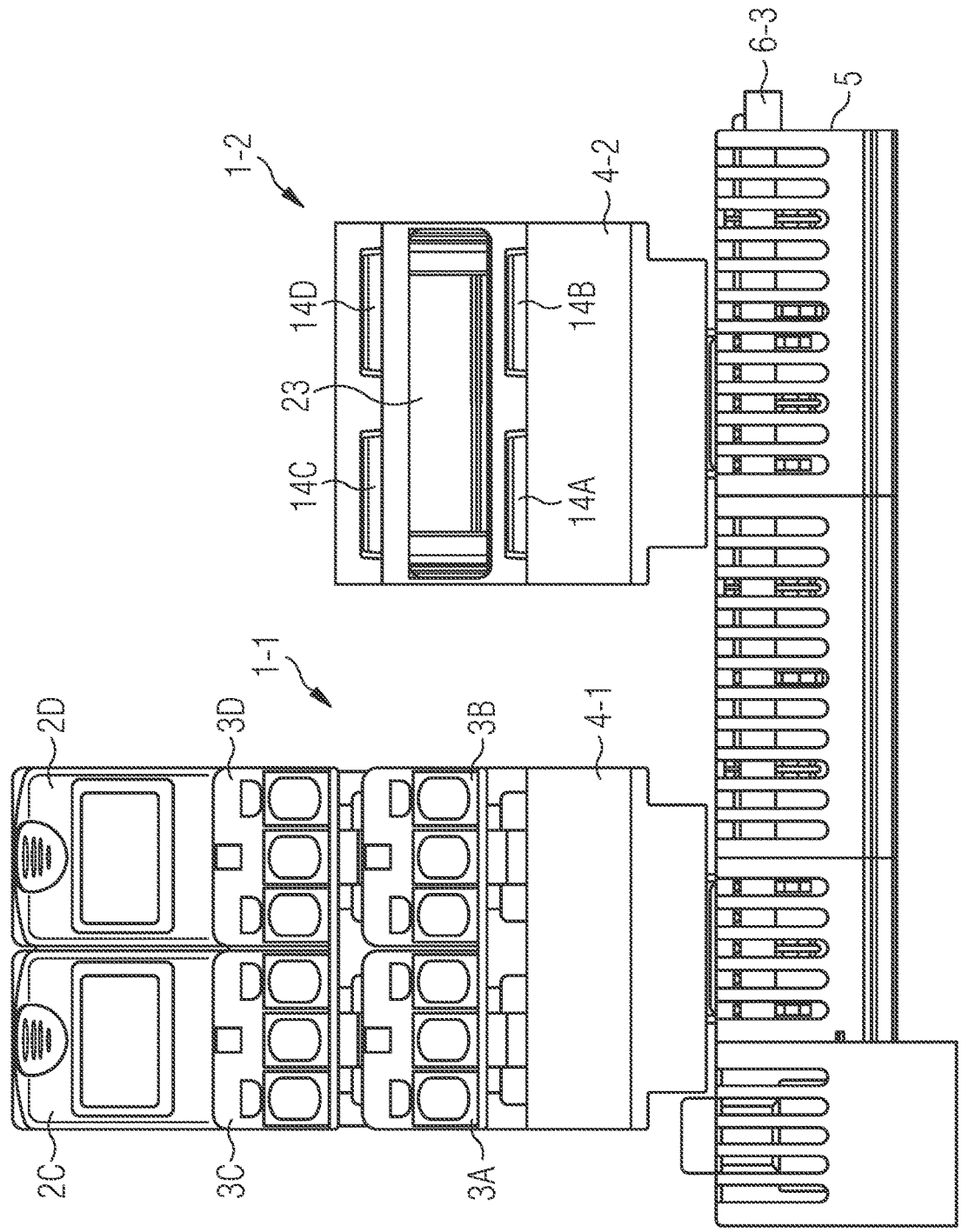
FIG. 3 is a bottom view of the assembly shown in FIG. 1.

FIG. 3 shows a bottom view of the assembly shown in FIG. 1. On the left side, the first adapter device 1-1, equipped with switch-disconnectors 2C, 2D, and on the right side, the second, un-assembled adapter device 1-2, may be seen. In the exemplary embodiment shown, the contact-protection system 5 comprises slots. As can be seen, the lower busbar 6-3 of the main busbar system 7 extends inside the contact-protection system 5.

Figure 4:
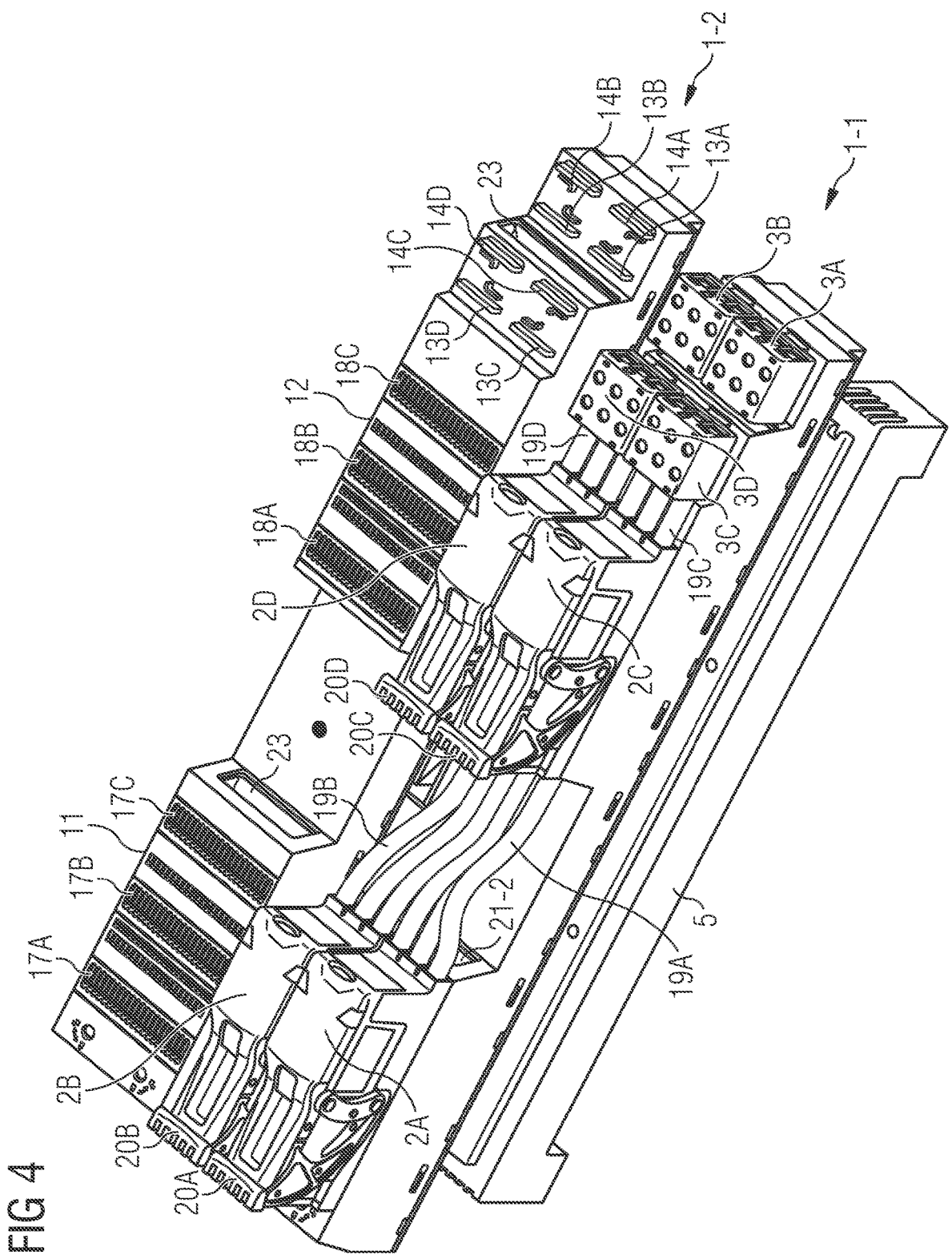
FIG. 4 is an isometric view of the assembly shown in FIG. 1.

FIG. 4 shows an isometric view or perspective view of the assembly shown in FIG. 1. FIG. 4 shows how outlet lines 19 from mounted electrical equipment are routed through feed-through tunnel 23 in a direction along the longitudinal axis of the adapter housing 4 to an end face of the adapter housing 4.

Figure 5:
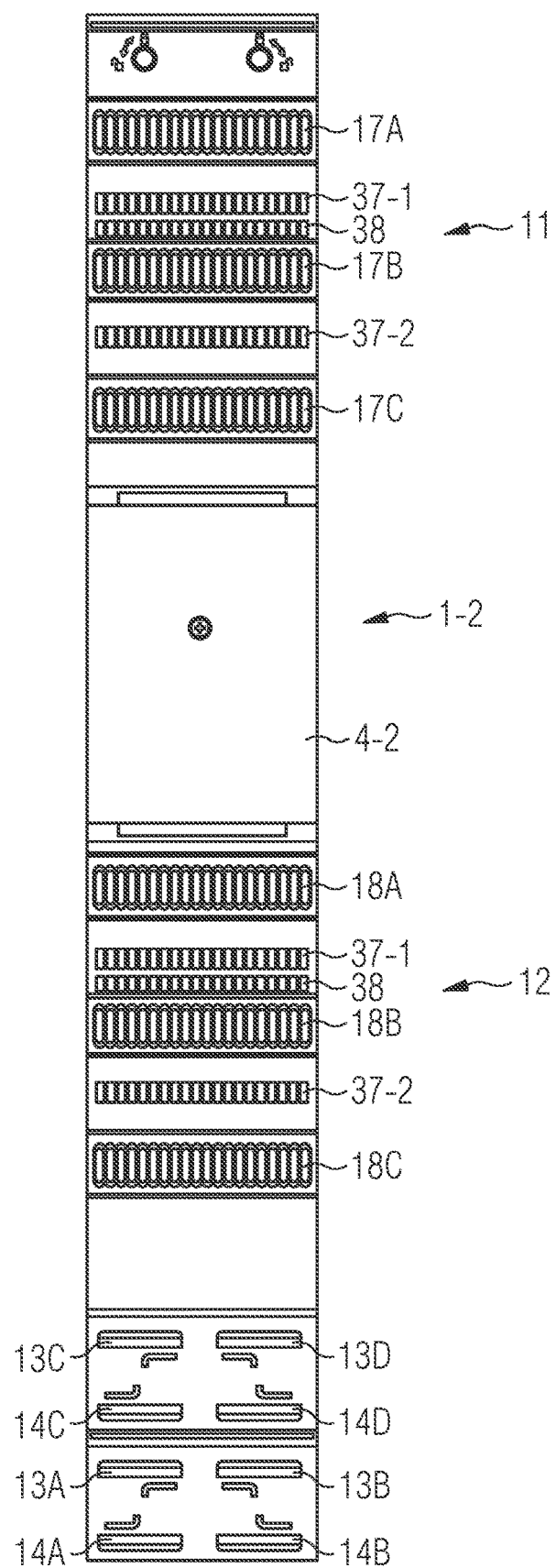
FIG. 5 is a front view of an embodiment of the adapter device according to the present invention without electrical devices or components mounted thereon.

FIG. 5 shows a front view of an adapter device 1 without assembled electrical devices or components 2.

Figure 6:
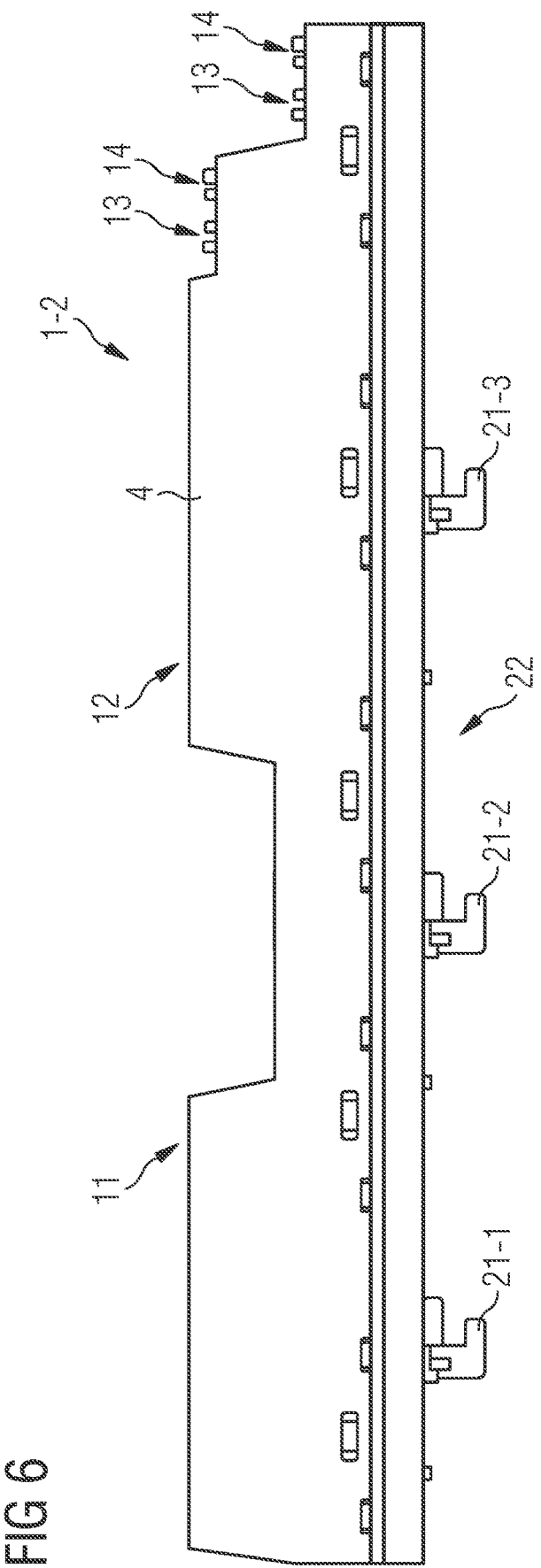
FIG. 6 is a side view from the left side onto the exemplary embodiment of an adapter device according to the present invention shown in FIG. 5.

FIG. 6 shows a side view of the non-assembled adapter device 1 shown in FIG. 5. The housing 4 comprises protrusions for the two busbar sub-systems 11, 12, in which the integrated busbars 15, 16 of the busbar sub-systems 11, 12 are located. On the right-hand side of the lower front face, the support or top-hat rails 13, 14 for the attachment of terminal blocks 3 or other accessories may be seen. The adapter device 1 shown in FIG. 6 is not mounted on the contact-protection system 5, so that the various clamping brackets 21-1, 21-2, 21-3 for snapping or pushing onto the busbars 6-1, 6-2, 6-3 of the main busbar system 7 are visible. The adapter housing 4 comprises a busbar main interface 22 on the rear side of the housing. For each busbar 6-i or phase L of the main busbar system 7, this main busbar interface 22 comprises at least one associated contact component 21 for electromechanical contacting of the corresponding busbar 6-i of the main busbar system 7. Several busbars 15, 16 of different busbar sub-systems 11, 12 provided on the front side of the adapter housing 4 may be electrically connected in parallel to this contact component 21 via the lines or brackets 28 integrated in the adapter housing 4.

Figure 7:
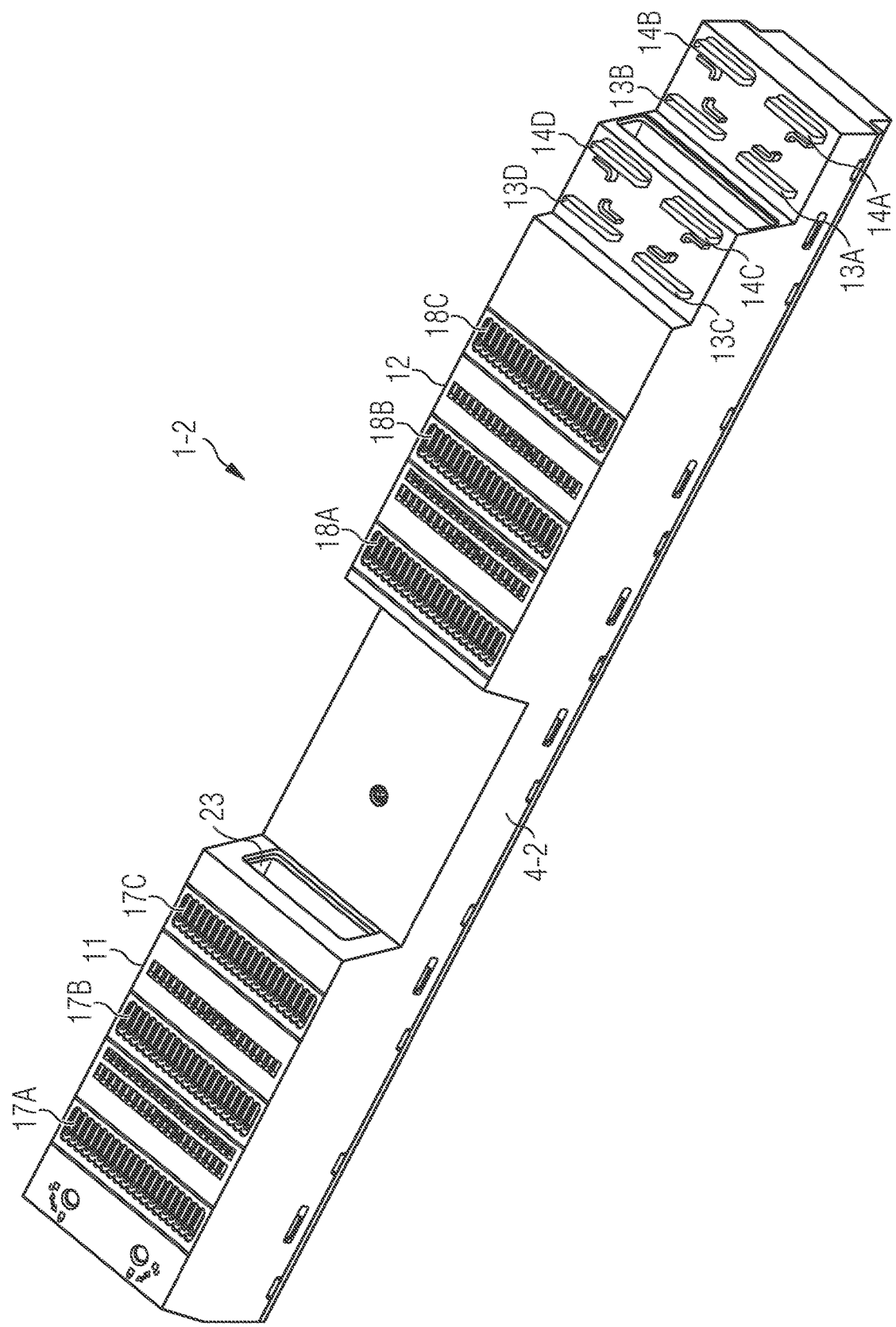
FIG. 7 is an isometric view of the adapter device shown in FIG. 5.

FIG. 7 shows an isometric or perspective view of the adapter device 1-2 shown in FIG. 5, 6, which is not equipped i.e. not assembled.

Figure 8:
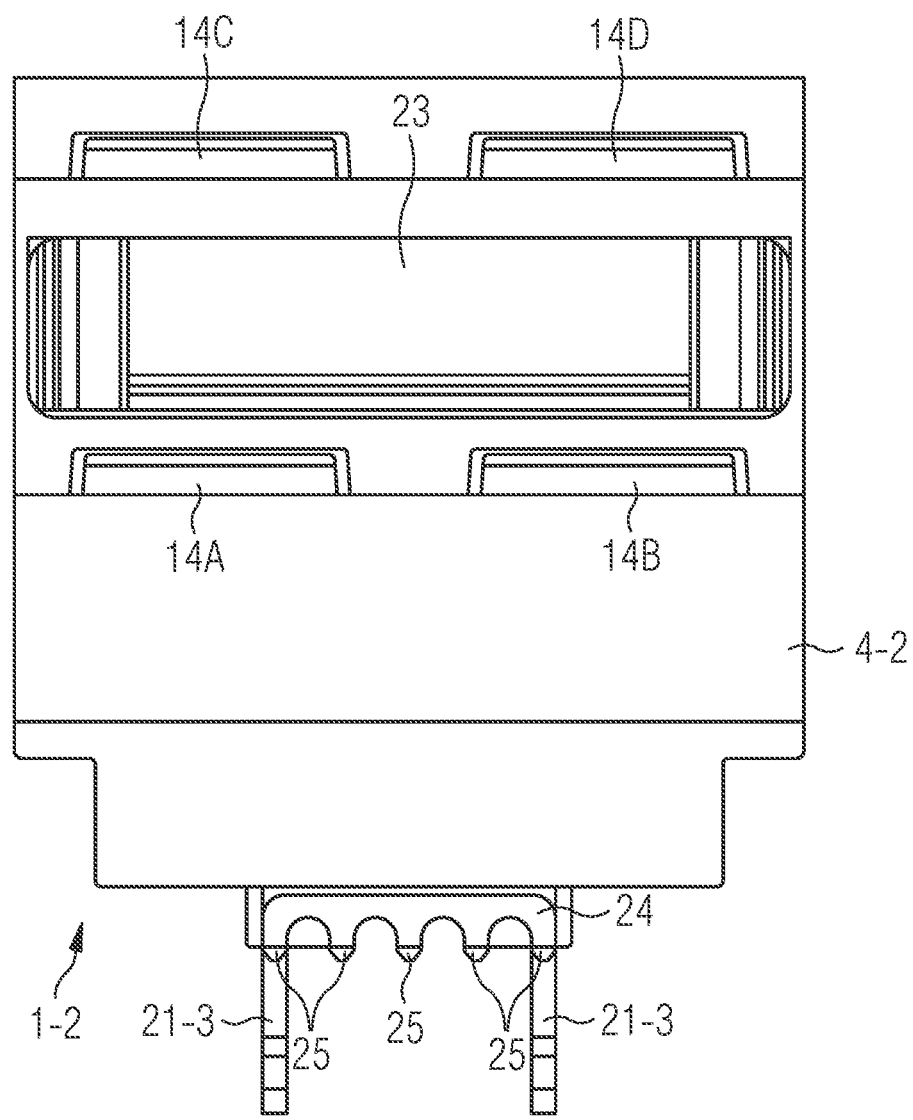
FIG. 8 is a bottom view of the adapter device shown in FIG. 5.

FIG. 8 shows a bottom view of the non-assembled adapter device 1-2 shown in FIGS. 5 to 7. No terminal blocks 3 or other accessories are mounted on the top hat or mounting rails 14. FIG. 8 shows the hook-shaped terminal block 21-3 for placing on the busbar 6-3 of the busbar main system 7. A connection terminal with a contact plate 24 may be provided on the underside of the housing 4. In a possible embodiment, this contact plate comprises contact lamellas 25 arranged in parallel. In a possible embodiment, these contact lamellas 25 can make electrical contact with a busbar 6 of the main busbar system 7 below through contact slots of a contact-protection module of the contact-protection system 5.

Figure 9:
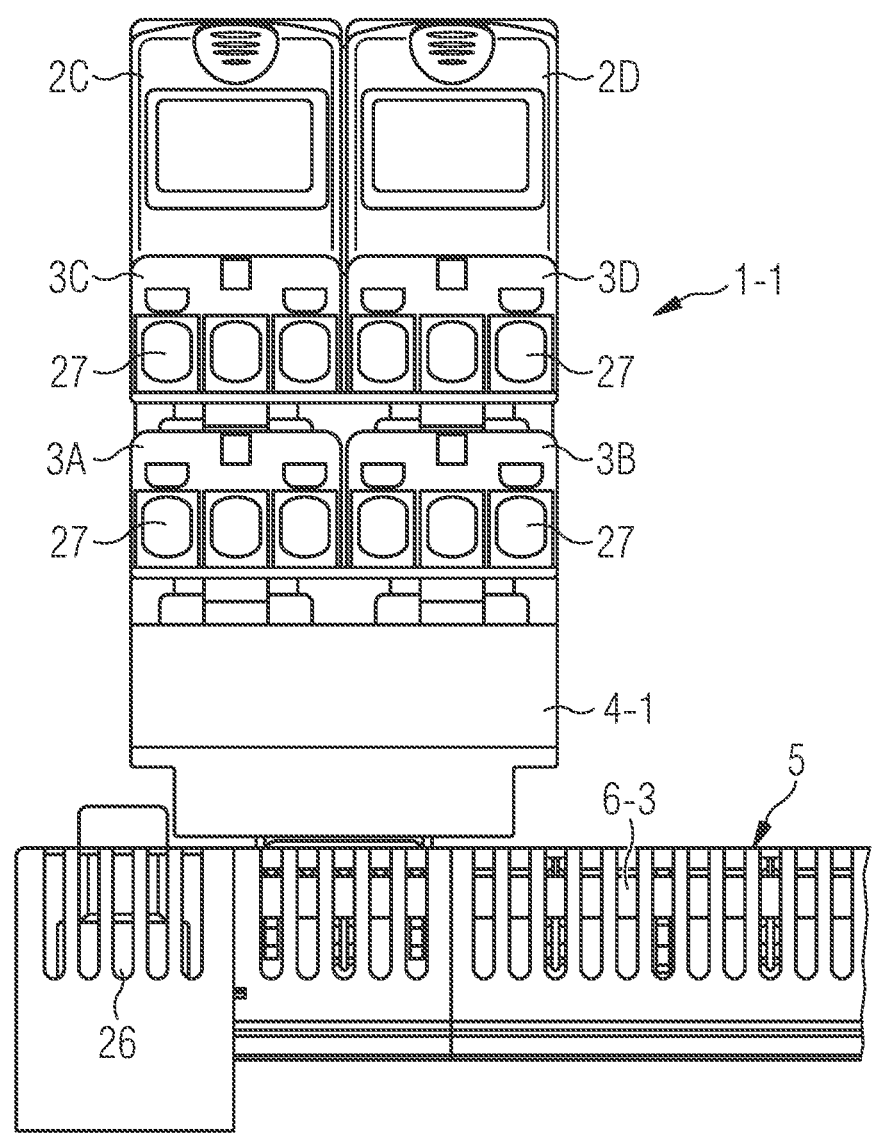
FIG. 9 is a bottom view of an adapter device equipped with four NH00 fuse-switch-disconnectors and four terminal blocks, mounted on a contact-protected busbar system.

FIG. 9 shows a bottom view of an adapter device 1-1 equipped with fuse-switch-disconnectors and terminal blocks 3. FIG. 9 shows the four terminal blocks 3A to 3D for the four components or parts 2A to 2D, each terminal block having 3 terminals 27 for connecting an associated electrical power load (L1, L2, L3). As may be seen from FIG. 9, the rail carrier 26 of the main system 7 may be superimposed due to the shape of the adapter housing 4-1.

Figure 10:
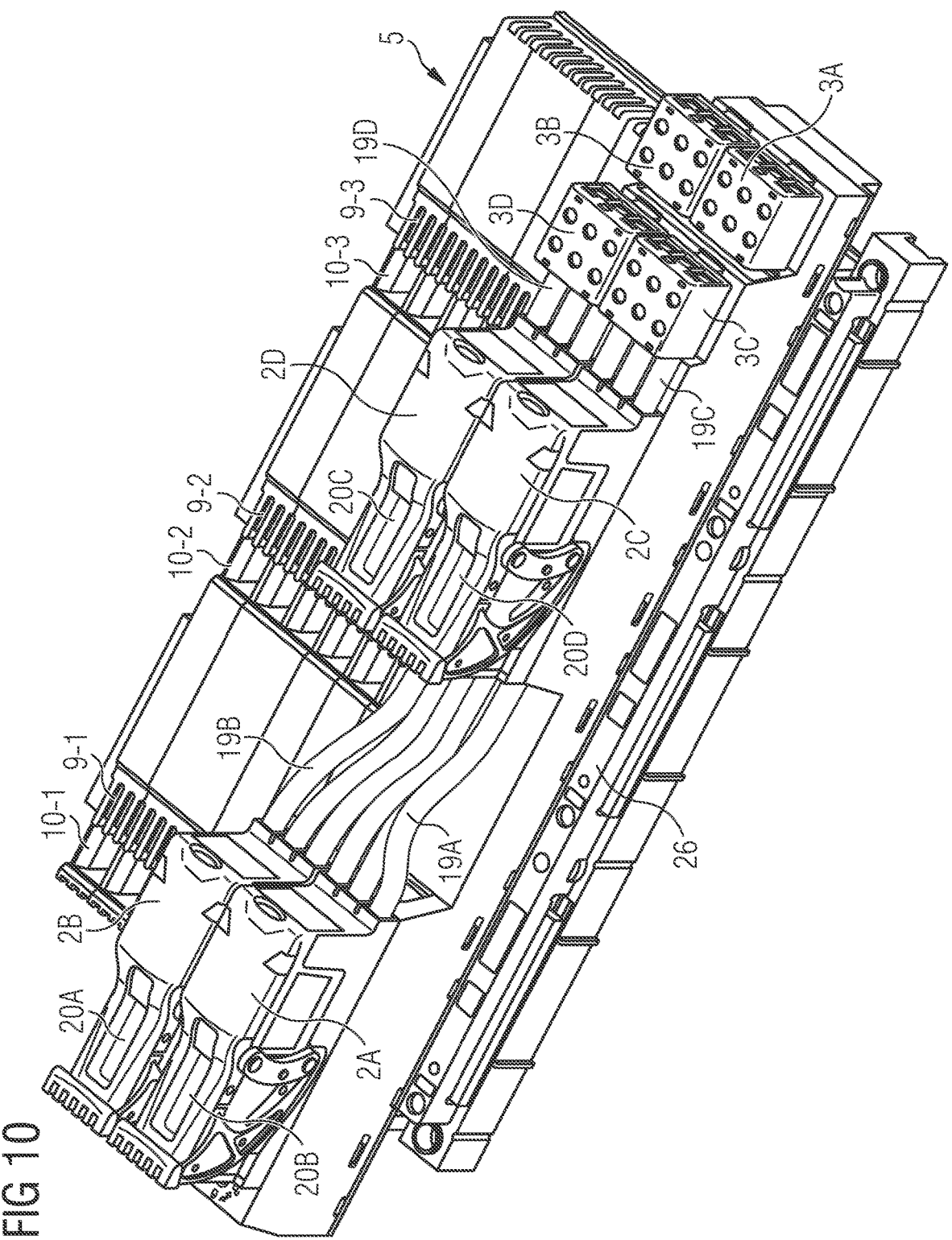
FIG. 10 is an isometric view of the assembly shown in FIG. 9.

FIG. 10 shows an isometric view of the assembly shown in FIG. 9.

Figure 11:
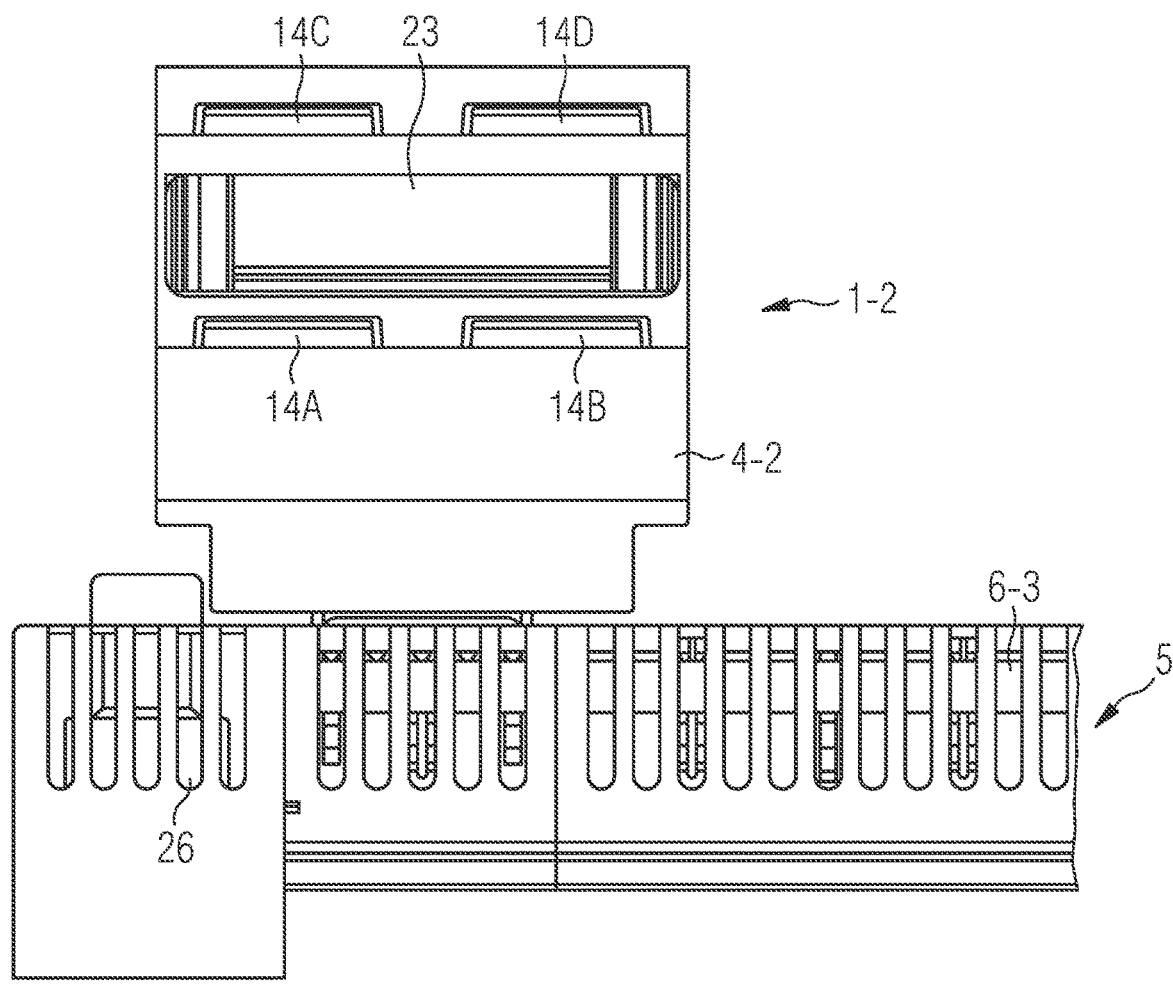
FIG. 11 is a bottom view of an adaptor device according to the present invention without any electrical devices or components mounted thereon, the adaptor device being mounted on a contact-protected busbar system.

FIG. 11 shows a bottom view of an adapter device 1 without components or parts 2, i.e. non-assembled, on a contact-protected system 5, wherein the rail carrier 26 is superstructured.

Figure 12:
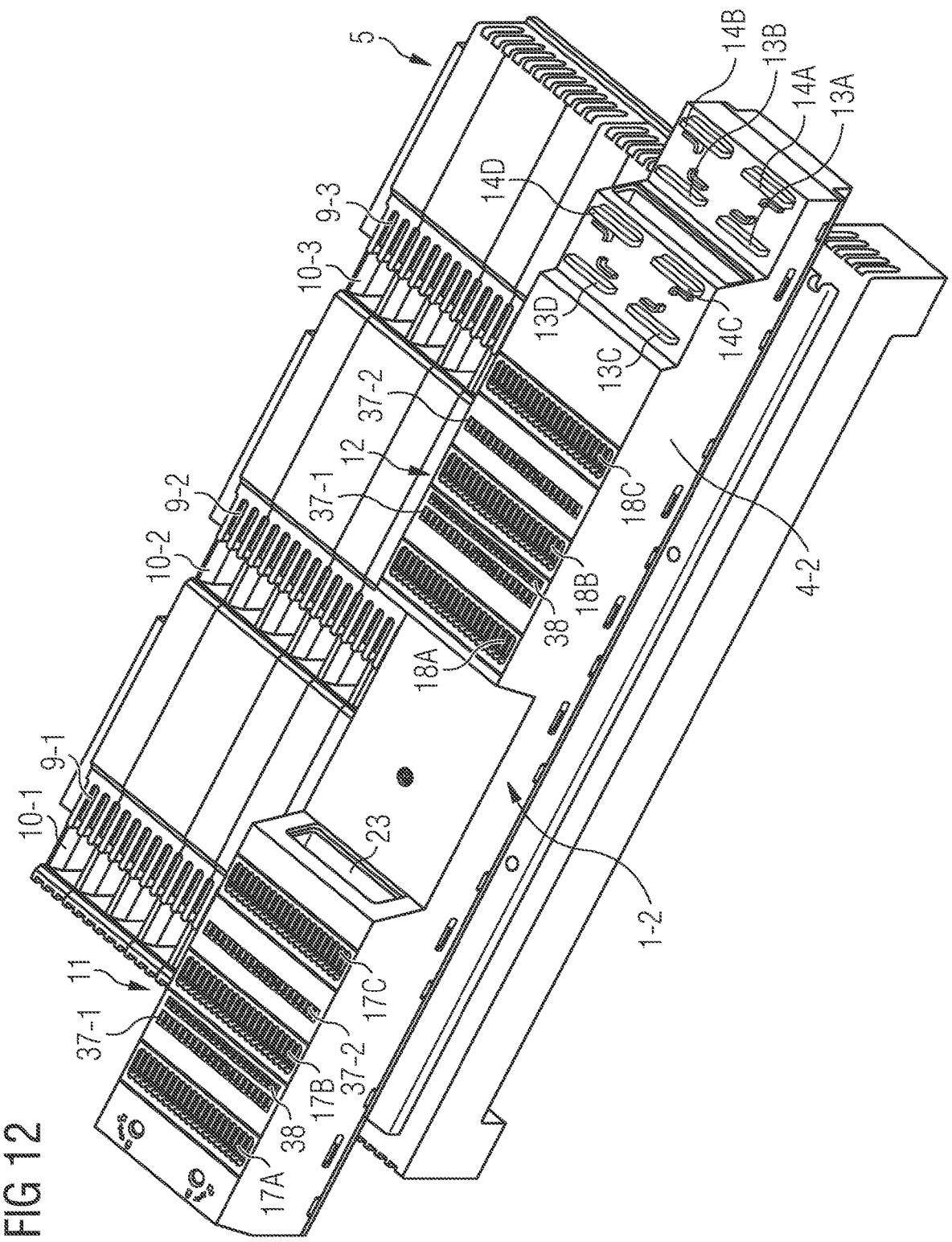
FIG. 12 is an isometric view of the assembly shown in FIG. 11.

FIG. 12 shows an isometric or perspective view of the non-assembled adapter device 1-2 shown in FIG. 11.

Figure 13:
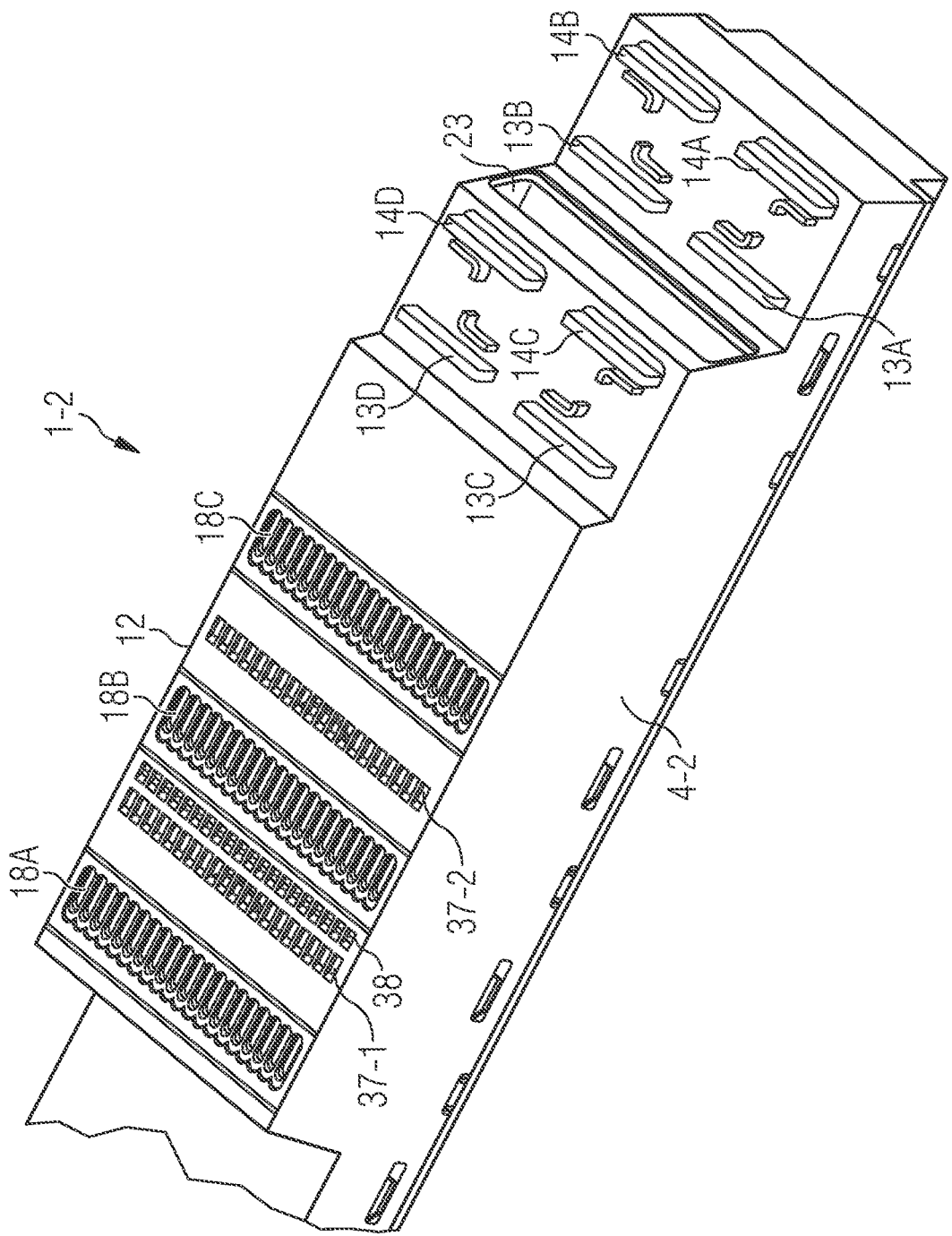
FIG. 13 is a detailed isometric view of the lower half of an adapter device without any electrical devices or components mounted thereon.

FIG. 13 shows an isometric detail view on the lower half for the non-assembled adapter device 1-2 with the top hat or carrier rails 13, 14 for the connection of terminal blocks 3 or other accessories, in particular current measuring devices, as shown in FIG. 12. In addition, a feed-through tunnel 23 is provided for the outlet lines 19, which extends underneath the busbar sub-interface of the busbar sub-system 12, shown in FIG. 13.

FIG. 14 shows an isometric or perspective view of an assembled adapter device 1-1 with four NH00 switch-disconnectors 2A to 2D and associated four terminal blocks 3A to 3D with the outlet lines laid in between, namely four times three (i.e. twelve) outlet lines 19.

FIG. 15 shows an isometric or perspective view of a lower part of the assembled adapter device 1-1 with four terminal blocks 3A to 3D and associated four load disconnectors 2A to 2D. Each of the three terminal blocks 3A to 3D has three terminals 27 for different current phases L1, L2, L3. The terminal blocks 27 are used for the connection of electrical power loads.

FIG. 16 shows a sectional view of an adapter device 1-1 equipped with electrical devices 2, which is mounted on a contact-protected 185 mm busbar system comprising three parallel busbars 6-1, 6-2, 6-3. Three integrated current transformers 31 may be recognized by the inlet contacts 29.

FIG. 17 shows a sectional view of a non-assembled adapter device 1-2 with the two busbar sub-systems 11, 12, each of which contains three parallel slotted busbars 15A, 15B, 15C and 16A, 16B, 16C. These are internally electrically connected to the busbars 6-i of the busbar main system 7.

FIG. 18 shows an isometric or perspective view of a non-assembled adapter device 1-2, showing details of interlocks between the upper and lower halves of the adapter housing 4-2. Two locking elements 36A, 36B are visible, which mechanically lock the front part of the adapter with the rear part of the adapter. Furthermore, slots 37 are provided for the insertion of mechanical locking elements, which are intended for the mounting of devices 2 on the sub interface. Furthermore, slots 38 may be provided to accommodate coding projections of the devices 2 to prevent a wrongly polarized connection of the devices 2.

FIG. 19 shows a sectional view through a feed-through or line tunnel with outlet lines 19, which extends below a busbar sub-system 11, 12.

FIG. 20 shows an isometric or perspective view of a non-assembled adapter device 1-2, where an upper housing part 4B-2 is shown separately from a lower housing part 4A-2 of the adapter housing 4-2. The adapter housing 4-2 of the non-assembled adapter device 1-2 comprises two separable adapter housing halves 4A-2, 4B-2. The two adapter housing halves 4A-2, 4B-2 comprise a first adapter housing half 4A-2 on the rear side of the adapter housing 4-2 and a second adapter housing half 4B-2 on the front side of the adapter housing 4-2. The first half of the adapter housing 4A-2 on the rear side of the adapter housing 4-2 has the main busbar interface 22 for electromechanical contacting of busbars 6-i of the main busbar system 7. The adapter housing half 4A-2 is also adapted in such a way that it is protected against accidental contact and the adapter upper part 4B-2 may be mounted and dismounted while voltage is applied.

The second half of the adapter housing 4B-2 at the front of the adapter housing 4-2 comprises the busbar sub-interfaces 11, 12 with the busbars 15, 16 of the busbar sub-systems 11, 12 integrated within the adapter housing 4-2. One may see in FIG. 20 the busbar sub-interface of the busbar sub-system 11 with three slotted busbars 15A, 15B, 15C, which contain contact pickup slots located below the rows of feed-through slots 17A, 17B, 17C shown in FIG. 20. In the area of the busbar sub-interface, the wall of the front side of the adapter housing 4 comprises feed-through slots 17A, 17B, 17C for the passage of electrical contacts of an electrical device 2 to be connected, which may be inserted or plugged into the contact slots of a busbar integrated in the adapter housing 4 for the electrical contacting of the busbars 6 of the busbar main system 7. The first lower half of the housing 4A-2 of the adapter housing 4-2 with the main busbar interface 22 may be permanently mounted on the busbars 6 of the main busbar system 7, preferably for electromechanical contacting of the busbars 6 of the main busbar system 7. The second half of the adapter housing 4B-2 provided on the front side of the adapter housing 4, which has the various busbar sub-interfaces, may be mechanically detached from the permanently mounted lower half of the adapter housing 4A-2 and may, for example, be mechanically reconnected to the first half of the adapter housing 4A-2 after rotation by 180° along a rotational or transverse axis of the adapter housing 4-2. Thus, it is possible to create a downward or upward outlet of the outlet lines 19. The upper or front half of the adapter housing 4B-2 may be placed or plugged onto the lower, fixedly mounted adapter housing half 4A-2. After unplugging, it is locked, for example, by several twist locks. The front half of the adapter housing 4B-2 may be unlocked again and reattached to the lower, fixed adapter housing half 4A-2, for example, rotated by 180°. In an alternative embodiment, the adapter housing 4 of adapter device 1 is configured integrally and may be rotated completely by 180° along the transverse axis or vertical axis to allow a line outlet in both directions.

FIG. 21 shows an isometric view of a non-assembled adapter device 1 with the two adapter housing halves 4A-1, 4B-1 separated from each other.

FIG. 22 shows a view similar to FIG. 21, where the top of the adapter housing 4B-2 is rotated by 180° to allow a line outlet to the top.

FIG. 23 shows an isometric view of a non-assembled adapter device 1-2 with the upper housing part 4B-2 rotated by 180° to provide an upward line outlet.

FIG. 24 shows an isometric or perspective view of an assembled adapter device 1-1 with four NH00 load break switches 2A-2D, where the upper housing part 4B-1 is rotated by 180°, so that the line outlet for the power consuming units may be implemented upwards.

FIG. 25 shows an isometric exploded view of a non-assembled adapter device 1-2 with two separable housing halves 4A-2, 4B-2 with the components contained or integrated within the adapter housing 4-2. The upper half of the housing 4B-2 comprises two busbar sub-systems 11, 12 with corresponding interfaces. As may be seen in FIG. 25, each of the two busbar sub-systems 11, 12 contains three slotted busbars 15A, 15B, 15C and 16A, 16B, 16C, respectively, integrated within the adapter housing 4-2. The busbars 15, 16 are slotted busbars which are formed by a contact-receiving rail profile which has evenly spaced contact slots for receiving electrically protruding contacts of an electrical device 2 to be connected. On the front side of the upper adapter housing 4B-2, in the area of the busbar sub-interface 11, 12 equally spaced feed-through slots 17A, 17B, 17C and 18A, 18B, 18C are provided, which are located directly above the contact receiving slots of the slotted busbars 15, 16. A protruding electrical contact of an electrical device 2, e.g. a switch-disconnector, is passed through a feed-through slot 17, 18 and inserted into a receiving slot of the slotted busbars 15, 16 directly below. The slotted busbars 15, 16 are connected by internal electrical lines or rails with contact components on the underside of the adapter housing 4 to contact the busbars 6-i of the main busbar system 7. FIG. 25 shows the contact components for placing the lower side of the adapter housing 4 on the busbars 6. In the exemplary embodiment shown in FIG. 25, the lower half of the adapter housing 4A is adapted in two parts for installation. Furthermore, FIG. 25 shows three current-carrying rails 28A, 28B, 28C integrated in the adapter housing 4, which connect two busbars of the two busbar sub-systems 11, 12 connected in parallel, respectively. Alternatively, a connection by means of electrical round or flat conductors is possible. For example, the first slot busbar 15A of the first busbar sub-system 11 is electrically connected to the corresponding slot busbar 16A of the busbar sub-system 12. Each of the three current-carrying bars 28A, 28B, 28C is connected to a corresponding electrical contact component 29 on the underside of the adapter housing 4 for contacting the busbars 6 of the main busbar system 7.

FIG. 26 shows an isometric exploded view from the bottom right of the assembled adapter device 1-2.

FIG. 27 shows a perspective view of the contact system integrated in the adapter housing 4 for contacting the busbar sub-systems 11, 12 with the main busbar system 7.

FIG. 28 shows an isometric view of the contact system shown in FIG. 27 from the other side.

FIG. 29 shows a detailed view of a plug-in contact 30, which implements a detachable connection between an adapter lower part and an adapter upper part of adapter device 1.

FIG. 30 shows an isometric view from the top left of an inlet contact area 29 without clamping bracket 21.

FIG. 31 shows an illustration according to FIG. 30, but with a clamping bracket 21 with two hook-shaped areas for engaging behind a busbar 6 of the main busbar system 7 and for contacting a busbar 6 of the contact-protected main busbar system 7.

FIG. 32 shows an isometric detail view of an inlet contact area with a current measuring device or current transformer 31 installed thereon.

FIG. 33 shows an isometric view of a possible installation of an assembled adapter device 1-1 with four electronic or electrical devices 2A-2D mounted thereon within a switch cabinet with indicated switch cabinet cover 32.

FIG. 34 shows an isometric view of an adapter device 1 with various components or parts 2E, 2F mounted thereon. In the example shown, the two devices or components 2E, 2F (one per sub-system) are an adapter for circuit breakers. The circuit breakers are mounted or installed on the adapter device 1 as shown in FIG. 34.

FIG. 35 shows an isometric view of an adapter device 1 with additional components or devices 2H, 2J. In the example shown, a power supply unit and an electronic motor starter are installed on the upper busbar sub-system 11. On the lower busbar sub-system 12, in the example shown, there is an adapter 2J for a motor starter.

FIG. 36 shows an isometric view of a contact system from the bottom right. The illustration shows a possible separation between an upper and lower adapter part or adapter housing half to illustrate the function of the plug-in contacts. FIG. 36 also shows three current measuring units 34A, 34B, 34C for measuring the current flowing through the busbars 16A, 16B, 16C, and three current measuring units 35A, 35B, 35C for measuring the current flowing through the busbars 15A, 15B, 15C (current measurement on the inlet side).

The adaptor device 1 according to the present invention is not limited to the exemplary embodiments shown in FIGS. 1 to 36. For example, the adapter device 1 may include more than two busbar sub-systems. Furthermore, the busbar sub-systems may also include other types of busbars, for example solid busbars without contact slots, as shown in FIG. 37. The profile of the busbars of the busbar sub-systems may also be modified, for example to achieve higher current ratings.

FIG. 38 shows another exemplary embodiment with busbars 15, 16, which are adapted as hybrid busbars, wherein the current-carrying busbar profile is adapted for a higher nominal current intensity than in the embodiment shown in FIG. 36. The hybrid busbars 15, 16 in FIG. 38 are adapted to fit into a rectangular envelope and may thus easily replace conventional solid busbars with a rectangular cross-section. They comprise a contact-receiving section with contact slots and a current-carrying section with solid cross section, as shown in FIG. 38. Other shapes are possible, for example a T-shaped current-carrying section. In addition to the electrical connection rails or electrical lines shown in the exploded view, additional bus lines may be provided for communication between the various devices. The number of parallel arranged busbars of the different busbar sub-systems 11, 12 and/or of the busbar main system 7 may vary depending on the application, for example more than three busbars per busbar system may be provided, in particular neutral or protective conductors. The shape and number of contact components may also vary depending on the application.

The adapter device 1, which is in accordance with the present invention, allows flexible combination of varying busbar systems. The adapter device 1 is adapted in such a way that the highest possible number of electrical devices 2 as well as electrical power loads may be mounted in a space-saving manner within a switch cabinet. The busbar supports are configured to be completely superstructured. By means of the present invention-appropriate adapter device 1, different busbar sub-systems, for example a Crossboard, or classic busbar systems may be adapted to a higher-level main busbar system 7. Accessories, in particular measuring equipment, may be mounted on mounting rails 13, 14 of the adapter device 1 or integrated within the adapter housing 4. These measuring devices may, in a possible embodiment, supply measuring data via data or bus lines to a central control device, which is mounted in the switch cabinet, for example. This allows a complete control or monitoring of the attached electrical devices 2 and/or the connected power consumption units or power loads. The adapter device 1 according to the present invention may be easily placed and mounted on an existing main busbar system 7 with parallel horizontal busbars 6-i with little mounting effort. In addition, electrical devices 2, e.g. load-break switches, may be easily mounted directly from the front by an installer, wherein complete protection against accidental contact is ensured. This allows electrical devices 2 to be fitted and removed even during continuous operation of the busbar system without endangering the safety of the operator or installer. It is also easy to ensure that the outlet lines 19 may be guided upwards or downwards, depending on the application. The width of the busbar sub-system interfaces provided on the front may vary depending on the application and is not limited to the exemplary embodiments shown in FIGS. 1 to 36. In addition, an electrical device 2 may also be plugged onto busbar sub-systems of parallel mounted adapter devices 1 in order to draw or transmit power via different adapter devices 1.

FIG. 39 shows a frontal view of an assembly of the two adapter devices 1-1, 1-2, wherein the adapter device 1-1 shown on the left in FIG. 39 is assembled with four devices 2A to 2D, wherein the adapter device 1-2 shown on the right in FIG. 39 is not equipped or assembled.

FIG. 40 shows a perspective view of the non-assembled adapter device 1-2 shown in FIG. 39 on the right. The adapter device 1-2 has two busbar sub-systems 11, 12 with three busbars each integrated in the adapter housing 4. In the assembly shown in FIG. 40, movable elements or configuration elements 32 are provided, which may be moved back and forth between two positions to expose or cover feed-through slots 17, 18. In the configuration example shown in FIG. 40, both sub-interfaces of the sub-systems 11, 12 have four manually movable elements 32-1 to 32-4, wherein the elements 32-1, 32-2 are each shown in a lower position, while the movable elements 32-3, 32-4 are in the upper position. In the upper position of the movable elements 32, the feed-through slots 17 are located directly above the contact slots of the busbars of the busbar sub-systems 11, 12. In the lower position of the movable elements 32, terminal connection areas 33 are accessible from the front, as shown in FIG. 40. The movable elements 32 may be operated manually and may be moved back and forth between different positions. This makes it possible to place different types of devices on the busbar sub-systems 11, 12, namely, on the one hand, devices 2 having protruding contacts for insertion into the feed-through slots 17, 18 (and the contacting slots of the slotted busbars or hybrid busbars), and on the other hand, electrical devices 2 having connections for inserting clamping brackets into flatly sloped insertion devices of the terminal connection areas 33-i, which engage behind the busbars of the busbar sub-systems 11, 12 in order to establish an electrical contact and a mechanical connection. The movable elements 33 may comprise mounting openings and/or coding openings to protect against incorrectly polarized connection of the devices.

FIG. 41 shows a further exemplary embodiment of an assembly according to the present invention with an assembled adapter device 1-1 and an unassembled adapter device 1-2.

FIG. 42 shows a perspective view of the un-assembled adapter device 1-2 shown in FIG. 41 on the right. In this exemplary embodiment, the two sub-interfaces 11, 12 each comprise three rows of terminal connection areas 33-1, 33-2-, 33-3. The terminal connection areas 33-1, 33-2, 33-3 may comprise beveled insertion devices that serve to insert terminal clamps of the connection terminals for connecting the devices 2.

Other embodiments are conceivable. For example, the busbars, in particular slotted busbars or hybrid busbars may be covered with an electrically insulating layer to increase the protection against accidental contact. The communication or data signal transmission may be performed via the busbars, for example via PLC communication.

The invention claimed is:

1. An adapter device for connecting at least one electrical device to a busbar main system having busbars, in which the at least one electrical device is adapted for a busbar sub-system having busbars, wherein the adapter device includes an adapter housing comprising:
 a busbar main interface on a rear side of the housing and configured for electromechanically contacting busbars of the busbar main system and,
 one or more busbar sub-interfaces on a front side of the housing and which are provided for placing the at least one electrical device on the adapter device, and which are each provided for an electrical connection thereof to the busbar main system via busbars of the respective busbar sub-system and via associated electrical conductors contained in the adapter housing,
 wherein the busbars of the respective busbar sub-system are integrated in the adapter housing or attached thereto,
 wherein the adapter housing of the adapter device is elongated and defines a length,
 wherein the busbar main interface comprises, for each busbar of the busbar main system, at least one associated contact component for contacting the corresponding busbar of the busbar main system,
 wherein at least one of the busbars of the respective busbar sub-system and at least one associated contact component are spaced apart from each other along the length of the adapter housing, wherein the associated electrical conductor is configured to extend along the length of the adapter housing to bridge the distance between the at least one busbar and the associated contact component and to contact the at least one busbar of the respective busbar sub-system and the associated contact component, and wherein the adapter housing defines a longitudinal axis along the length and comprises, on the rear side of the housing along the longitudinal axis of the adapter housing, a plurality of contact components arranged one above the other along the longitudinal axis and configured for contacting a plurality of busbars of the busbar main system which extend in parallel with each other and in a horizontal direction transverse to the longitudinal axis.

2. The adapter device according to claim 1, wherein the adapter housing of the adapter device comprises two adapter housing halves which are separable from each other and which are electro-mechanically connected to each other.

3. The adapter device according to claim 2, wherein the two adapter housing halves comprise a first adapter housing half on the rear side of the adapter housing, which comprises the busbar main interface for electromechanically contacting of busbars of the busbar main system, and a second adapter housing half at the front side of the adapter housing comprising the busbar sub-interfaces having the busbars of the busbar sub-systems integrated in the adapter housing.

4. The adapter device according to claim 3, wherein the first housing half of the adapter housing having the busbar main interface for electromechanical contacting of the busbars of the busbar main system is fixedly mounted on the busbars of the busbar main system.

5. The adapter device according to claim 4, wherein the second adapter housing half, provided on the housing front side of the adapter housing and having the busbar sub-interfaces, is mechanically detachable from the first adapter housing half fixedly mounted to the busbars of the busbar main system, and is mechanically and electrically connectable to the first adapter housing half again after rotation by 180° along a transverse axis of the adapter housing.

6. The adapter device according to claim 1, wherein a plurality of bus bars of different bus bar sub-systems, provided on the front side of the adapter housing, are electrically connected in parallel to the contact component via conductors or bars contained in the adapter housing of the adapter device.

7. The adapter device according to claim 1, wherein the busbars of the busbar sub-systems integrated in the adapter housing each comprise slot-busbars, hybrid busbars or solid busbars.

8. The adapter device according to claim 7, wherein the hybrid busbars of the busbar sub-system each comprise a current-carrying rail profile and a contact-accommodating rail profile which comprises uniformly spaced contact slots for accommodating electrical contacts of an electrical device.

9. The adapter device according to claim 1, wherein a wall on the front side of the housing of the adapter housing adjacent the busbar sub-interface comprises feed-through-slots for passing through electrical contacts of an electrical device to be connected, which are insertable into underlying contact slots of a slot-busbar or hybrid busbar integrated in the adapter housing for electrically contacting the busbars of the busbar main system.

10. The adapter device according to claim 1, wherein the busbar main system comprises a number of at least two busbars for different current phases, which extend parallel to one another in the horizontal direction and which may each be electromechanically contacted by at least one contact component of the busbar main system provided on the rear side of the adapter housing (4) to establish an electrical connection with a corresponding number of busbars of different busbar sub-systems integrated in the adapter housing on the front side of the housing or attached thereto.

11. The adapter device according to claim 1, wherein the electrical devices placed on the busbar sub-interfaces comprise outlet lines which may be guided through feed-through tunnels in the direction of the longitudinal axis of the adapter housing to an end face of the adapter housing.

12. The adapter device according to claim 11, wherein mounting rails for attaching terminal blocks or accessory components are provided on at least one end face of the adapter housing.

13. The adapter device according to claim 1, wherein the electrical devices mounted on the busbar sub-interfaces of the adapter device comprise fuse-switch-disconnectors which are connected between the busbars of the busbar main system and electrical power loads, which are connected to terminals of terminal blocks and which, when manually operated, disconnect or connect the electrical power loads from or to the busbars of the busbar main system.

14. The adapter device according to claim 1, wherein the busbars of the busbar main system comprise a nominal current intensity different from the nominal current intensity of the busbars of the busbar sub-systems.

15. The adapter device according to claim 1, wherein current and/or voltage measuring units are integrated in the adapter housing of the adapter device for each busbar of the busbar main system and/or the busbar sub-systems.

16. The adapter device according to claim 1, wherein a data interface for forwarding and/or distributing signals of a bus system is provided on the front side of the adapter housing for the electrical devices mounted on a bus bar sub-interface.

17. The adapter device according to claim 1, wherein terminal blocks are provided for connecting electrical power loads to the adapter device, which terminal blocks are connected via conductors or bus bars to the electrical power loads mounted on the adapter device.

18. The adapter device according to claim 17, wherein current measuring units are provided which measure the electrical currents flowing through the conductors or busbars to the connected electrical power loads.

* * * * *